US011086902B2

(12) United States Patent
McGee et al.

(10) Patent No.: US 11,086,902 B2
(45) Date of Patent: Aug. 10, 2021

(54) METHOD AND SYSTEM FOR IMPLEMENTING A REDO REPEATER

(71) Applicant: Oracle International Corporation, Redwood Shores, CA (US)

(72) Inventors: Steven McGee, Bedford, NH (US); Jiangbin Luo, Bedford, NH (US); Benedicto Garin, Hollis, NH (US); Mahesh Girkar, Cupertino, CA (US); Michael Harvey, Hollis, NH (US); Nitin Karkhanis, Nashua, NH (US); Steve Lee, Hollis, NH (US); Juan Loaiza, Woodside, CA (US); Robert McGuirk, Nashua, NH (US); Hongjie Yang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 16/144,126

(22) Filed: Sep. 27, 2018

(65) Prior Publication Data
US 2019/0026353 A1 Jan. 24, 2019

Related U.S. Application Data

(63) Continuation of application No. 13/454,799, filed on Apr. 24, 2012, now Pat. No. 10,102,266.

(51) Int. Cl.
*G06F 16/27* (2019.01)
(52) U.S. Cl.
CPC .................. *G06F 16/275* (2019.01)

(58) Field of Classification Search
CPC .................................................... G06F 16/275
See application file for complete search history.

(56) References Cited

U.S. PATENT DOCUMENTS

| 6,658,589 | B1 | 12/2003 | Taylor |
| 7,464,113 | B1 | 12/2008 | Girkar et al. |
| 7,917,599 | B1 | 3/2011 | Gopalan et al. |
| 2004/0220981 | A1 | 11/2004 | Taylor |
| 2005/0114285 | A1 | 5/2005 | Cincotta |
| 2007/0220320 | A1* | 9/2007 | Sen ...................... G06F 11/1456 714/13 |
| 2008/0235294 | A1* | 9/2008 | Girkar .................. G06F 11/2076 |
| 2009/0070337 | A1 | 3/2009 | Romem et al. |

(Continued)

OTHER PUBLICATIONS

Vivian Schupmann: Oracle® Data Guard Concepts and Administration 10g Release 2 (10.2) Aug. 2008, pp. 1-386.*

(Continued)

*Primary Examiner* — Cam Y T Truong
(74) *Attorney, Agent, or Firm* — Vista IP Law Group, LLP

(57) ABSTRACT

Disclosed are methods and apparatuses to provide a redo repeater that allows for no data loss protection without the performance impact to the primary database even when a significant geographical distance separates the primary and standby databases. The Repeater is a lightweight entity that receives redo from the primary database with the purpose of redistributing that redo throughout the primary/standby system configuration. The Repeater able to extend no data loss protection and switchover functionality to terminal standby databases even though the primary database does not need to have a direct connection with those destinations.

20 Claims, 33 Drawing Sheets

(56) References Cited

U.S. PATENT DOCUMENTS

| | | | |
|---|---|---|---|
| 2009/0157764 A1 | 6/2009 | Kundu et al. | |
| 2010/0064168 A1 | 3/2010 | Smoot et al. | |
| 2011/0093522 A1* | 4/2011 | Chen | H04L 29/12066 709/203 |
| 2011/0225367 A1 | 9/2011 | Rajvanshy | |
| 2012/0030508 A1* | 2/2012 | Vivian | G06F 11/2097 714/6.3 |
| 2012/0054158 A1 | 3/2012 | Hu et al. | |
| 2012/0159234 A1 | 6/2012 | Mehta et al. | |
| 2014/0330785 A1* | 11/2014 | Isherwood | H04L 67/10 707/640 |

OTHER PUBLICATIONS

Invitation to Pay Additional Fees dated Oct. 25, 2013 for U.S. Patent Application No. PCT/US2013/038029, 4 pages.
Non-final Office Action dated May 16, 2013 for U.S. Appl. No. 13/454,888.
Oracle Data Guard Concepts and Administration 10g Release 2 (10.2) Aug. 2008 Copyright 1999, 2008, Oracle Primary Author: Vivian Schupmann.
Final Office Action dated Nov. 8, 2013, for U.S. Appl. No. 13/454,888.
Advisory Action dated Jan. 21, 2014, for U.S. Appl. No. 13/454,888.
International Search Report and Written Opinion dated Apr. 11, 2014 for PCT Patent Application No. PCT/US2013/038029, 15 pages.
Non-final Office Action dated Mar. 28, 2014 for U.S. Appl. No. 13/454,888, 11 pages.
Final Office Action dated Oct. 15, 2014 for U.S. Appl. No. 13/454,888.
Advisory Action dated Dec. 24, 2014 for U.S. Appl. No. 13/454,888.
Non-final Office Action dated Oct. 7, 2015 for U.S. Appl. No. 13/454,888.
Final Office Action dated May 4, 2016 for U.S. Appl. No. 13/454,888.
Non-final Office Action dated Jun. 7, 2013 for U.S. Appl. No. 13/454,799.
Final Office Action dated Dec. 13, 2013, for U.S. Appl. No. 13/454,799.
Non-Final Office Action dated Mar. 25, 2014 for U.S. Appl. No. 13/454,799.
Final Office Action dated Jul. 15, 2014 for U.S. Appl. No. 13/454,799.
Advisory Action dated Sep. 24, 2014, for U.S. Appl. No. 13/454,799.
Non-final Office Action dated Nov. 19, 2014 for U.S. Appl. No. 13/454,799.
Final Office Action dated Apr. 2, 2015 for U.S. Appl. No. 13/454,799.
Non-final Office Action dated Jul. 16, 2015 for U.S. Appl. No. 13/454,799.
Final Office Action dated Jan. 14, 2016 for U.S. Appl. No. 13/454,799.
Advisory Action dated Mar. 28, 2016 for U.S. Appl. No. 13/454,799.
Non-Final Office Action dated Jan. 9, 2018 for U.S. Appl. No. 13/454,799.
Notice of Allowance and Fee(s) dated Jun. 14, 2018 for U.S. Appl. No. 13/454,799.

* cited by examiner

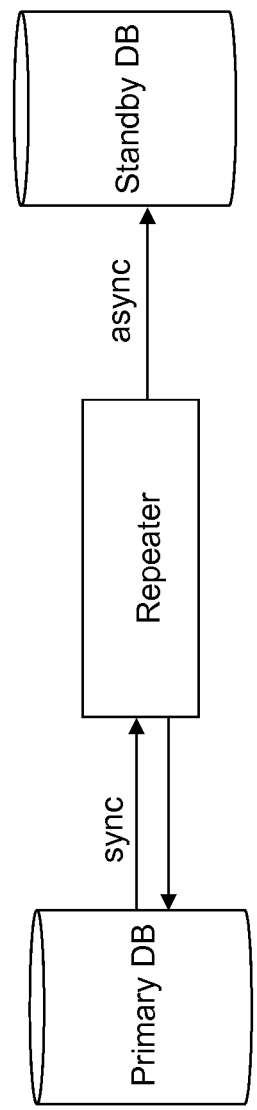
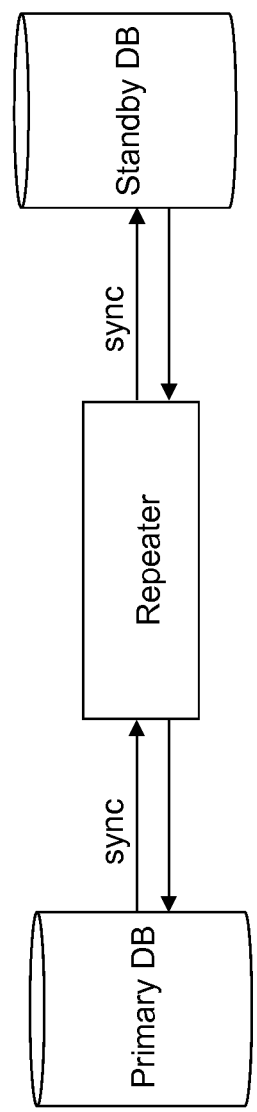

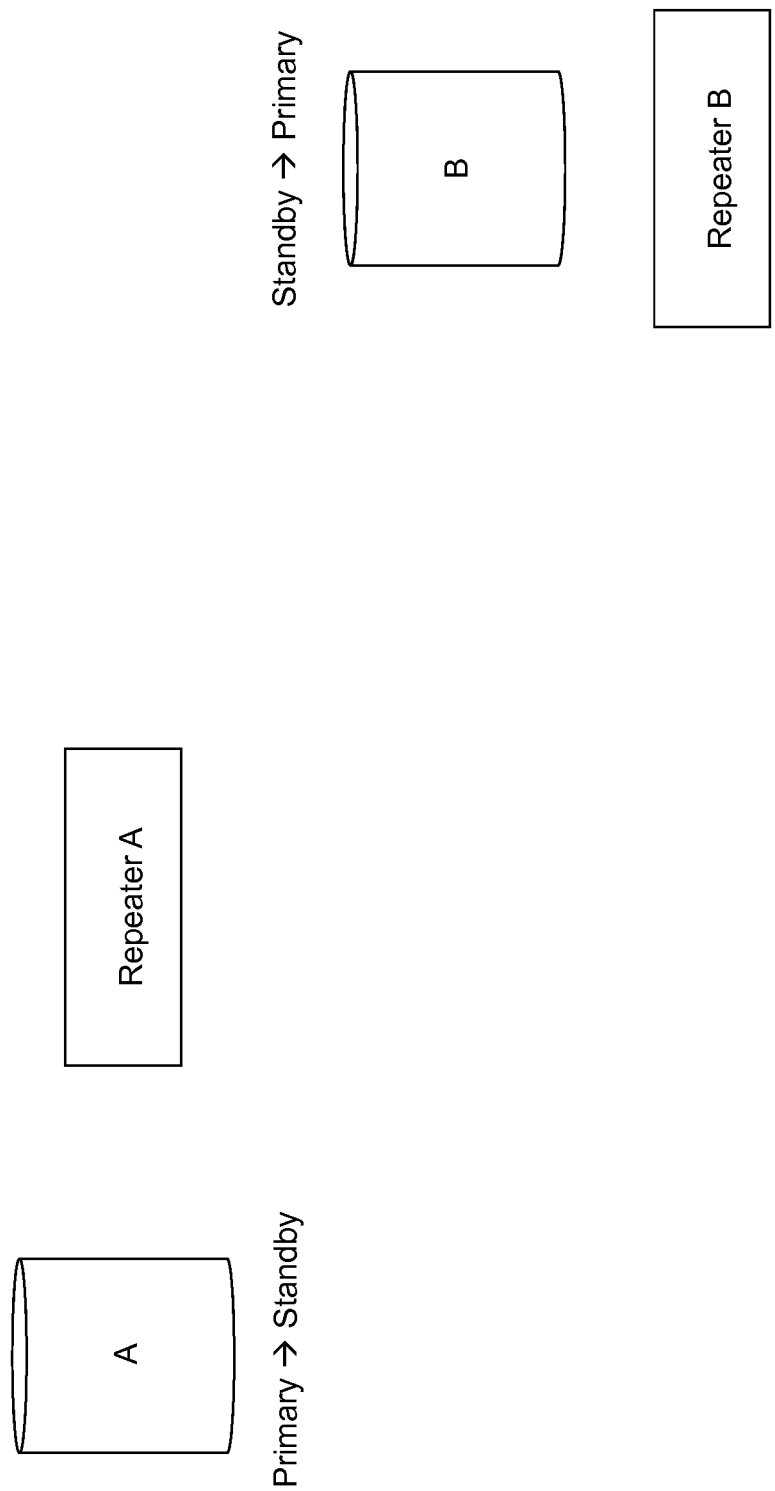

METHOD AND SYSTEM FOR IMPLEMENTING A REDO REPEATER

CROSS-REFERNCE TO RELATED APPLICATIONS

This Application is related to pending U.S. patent application Ser. No. 13/454,799, entitled "METHOD AND SYSTEM FOR IMPLEMENTING A REDO REPEATER", filed on Apr. 24, 2012, which is hereby incorporated by reference in its entirety.

BACKGROUND AND SUMMARY

Many enterprises use computer databases to store, organize, and analyze some of their most important information. For example, a business may employ a database to hold its sales and ordering information so that analysts can predict trends in product sales or perform other kinds of data mining for long-range planning. Because database systems are responsible for managing information vital to the organization's operation, it is important for mission-critical database systems to implement mechanisms for recovery following a database system failure.

One approach to implement disaster recovery by deploying a "standby" database system that is a replica of the business's primary database system. The standby database is typically created from a backup of the primary database, and the primary database and the standby database coordinate with each other such that the standby database keeps up with changes made on the primary database. In the event of an irrecoverable crash or other disaster, the standby database can quickly be activated ("failover") to become the business's new primary database.

There are numerous ways to synchronize the primary database with the standby database. One possible approach is to use log files to synchronize the two databases. One common type of database log is the "redo log", which contain records of changes that are made to the database. In many database systems, the redo log is used to reapply changes that were previously made, e.g., if it becomes necessary to restore a previously committed transaction due to occurrence of a failure. For this reason, a transaction is often not considered committed unless its redo records have been stored in some persistent way.

With standby databases, the redo log records can be sent to the standby database and applied to the data at the standby database to replicate changes that are made at the primary database. This approach takes advantage of the fact that redo logs are being created at the primary database anyway, and can therefore be cheaply leveraged to provide a replication mechanism for applying changes to the standby database.

Standby configurations can generally be classified into two broad categories, including a "high performance" category and a "no data loss" category. The high performance approach is illustrated in FIG. 1A. In this approach, a transaction is first executed at the primary database 126a, e.g., to modify a database table 132a within user data 130a. A redo log 128a includes redo records that are generated to correspond to the transaction. The redo records in the redo log 128a are transmitted from the primary database 126a to the standby database 126b. The redo records would be stored within a redo log 128b at the standby database 126b and/or applied to the equivalent database table 132b within a copy of the user data 130b to replicate the changes made at the primary database 126a.

The hallmark of the high performance approach is that the transaction at the primary database 126a is permitted to commit without waiting for an acknowledgement that the redo records have been stored at the standby database 126b. In some configurations, the commit of the transaction at the primary may even occur prior to shipping of the redo records to the standby. Therefore, with high performance configurations, servicing a standby database imposes a negligible performance impact on the primary database since there is minimal delay and latency imposed by the requirement to maintain synchronization with the standby database. However, this configuration runs the risk of possible data loss since there is no confirmation that the redo records have actually been received at the standby database, and therefore in the event of a failure it is possible the changes made by the transaction associated with the redo records can be lost.

The no data loss approach provides greater assurance of data security as compared to the high performance approach, but at the expense of performance costs. As illustrated in FIG. 1B, the no data loss configurations protect against data loss from any single source of failure by requiring receipt of an acknowledgement from the standby database 126b before allowing the transaction at the primary database 126a to commit. When a user transaction is committed, the redo generated by that transaction must safely reside at the standby database 126b (e.g., in the redo log 128b) before the primary database 126a receives acknowledgment such that a commit can occur for the transaction. The added step of shipping the redo to the standby database and waiting for an acknowledgement imposes a delay that is included in the commit latency. Since standby databases are normally located geographically distant from the primary database (e.g., to reduce the chance of a single point of failure affecting both the primary and the standby), the network latency is typically quite significant. High performance configurations do not suffer from this possible performance degradation because user transactions do not wait for confirmation of the remote standby to be serviced before receiving acknowledgment of the commit.

Therefore, the no data loss configurations protect against data loss from any single source of failure at the expense of possibly degrading the performance of the primary database. The degree of performance degradation is directly tied to the network latency between the primary and standby databases. The greater the geographical distance between the primary and standby database, the greater the network latency between them. In contrast, the high performance configuration minimizes commit delays, but runs the risk of possible data loss since there is no confirmation that the redo records have actually been received at the standby database.

As is evident, there is a need for an improved approach that addresses at least these problems with the prior approaches.

SUMMARY

Some embodiments of the invention address the above problems by providing a redo Repeater that allows for no data loss protection without the performance impact to the primary database even when a significant geographical distance separates the primary and standby databases. The Repeater is a lightweight entity that receives redo from the primary database with the purpose of redistributing that redo throughout the primary/standby system configuration. The Repeater able to extend no data loss protection and switchover functionality to terminal standby databases even though the primary database does not need to have a direct connection with those destinations.

Alternative embodiments provide for use of the Repeater to reduce the burden of servicing multiple standby databases, by offloading this type of workload from the primary database to the Repeater.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 7A-7D illustrate alternative Repeater configurations according to embodiments of the invention.

FIGS. 9A-9C illustrate a process for changing Repeaters according to some embodiments of the invention.

DETAILED DESCRIPTION

Figure 1A:
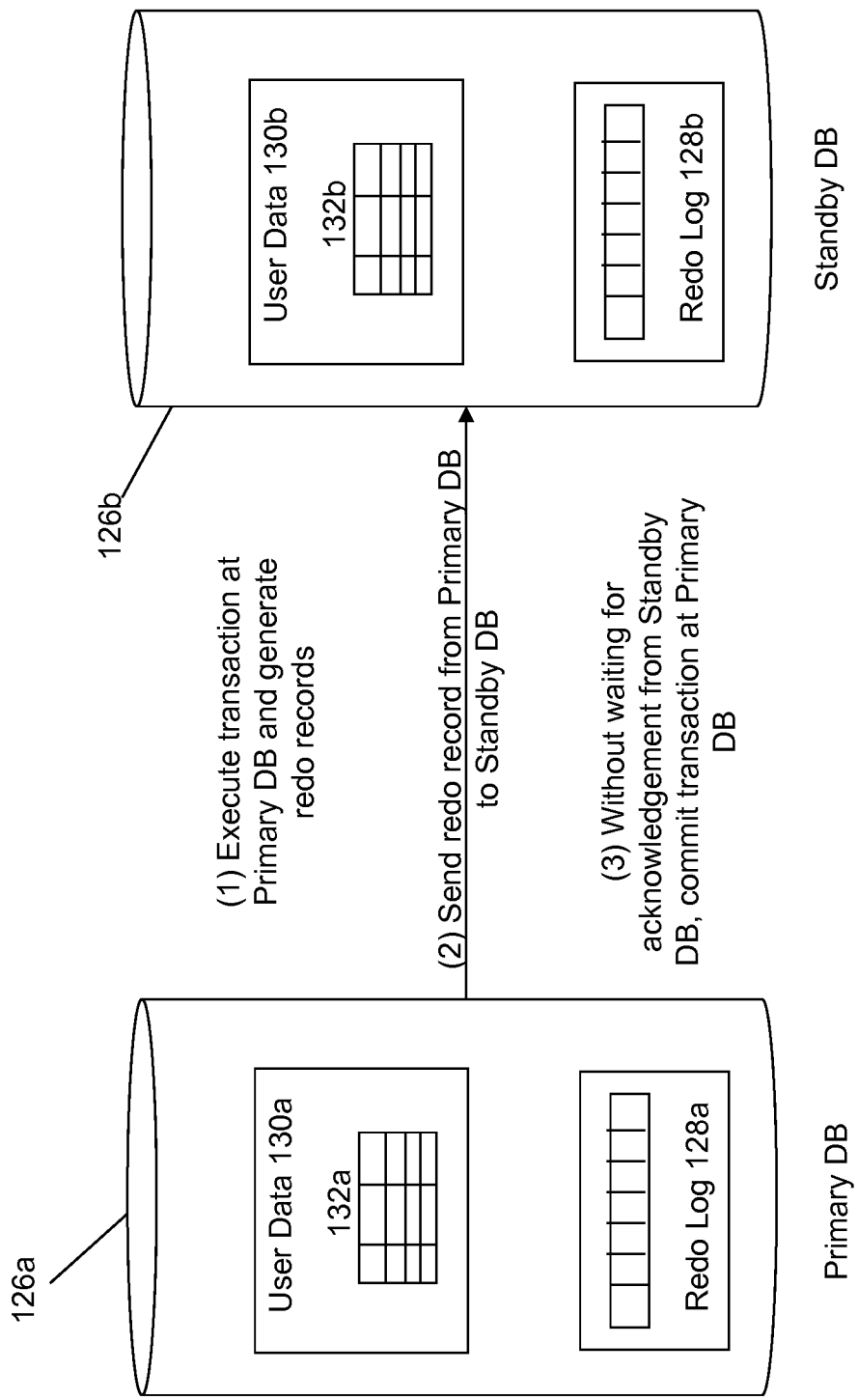
FIGS. 1A and 1B illustrate prior approaches to implement a standby database.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrative embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

To achieve no data loss protection across great geographical distances without impact to performance of the primary database, embodiments of the invention provide for the addition of an entity, referred to herein as a "Repeater" or "redo repeater", which is used to store and forward redo log records to one or more standby databases.

Figure 2:
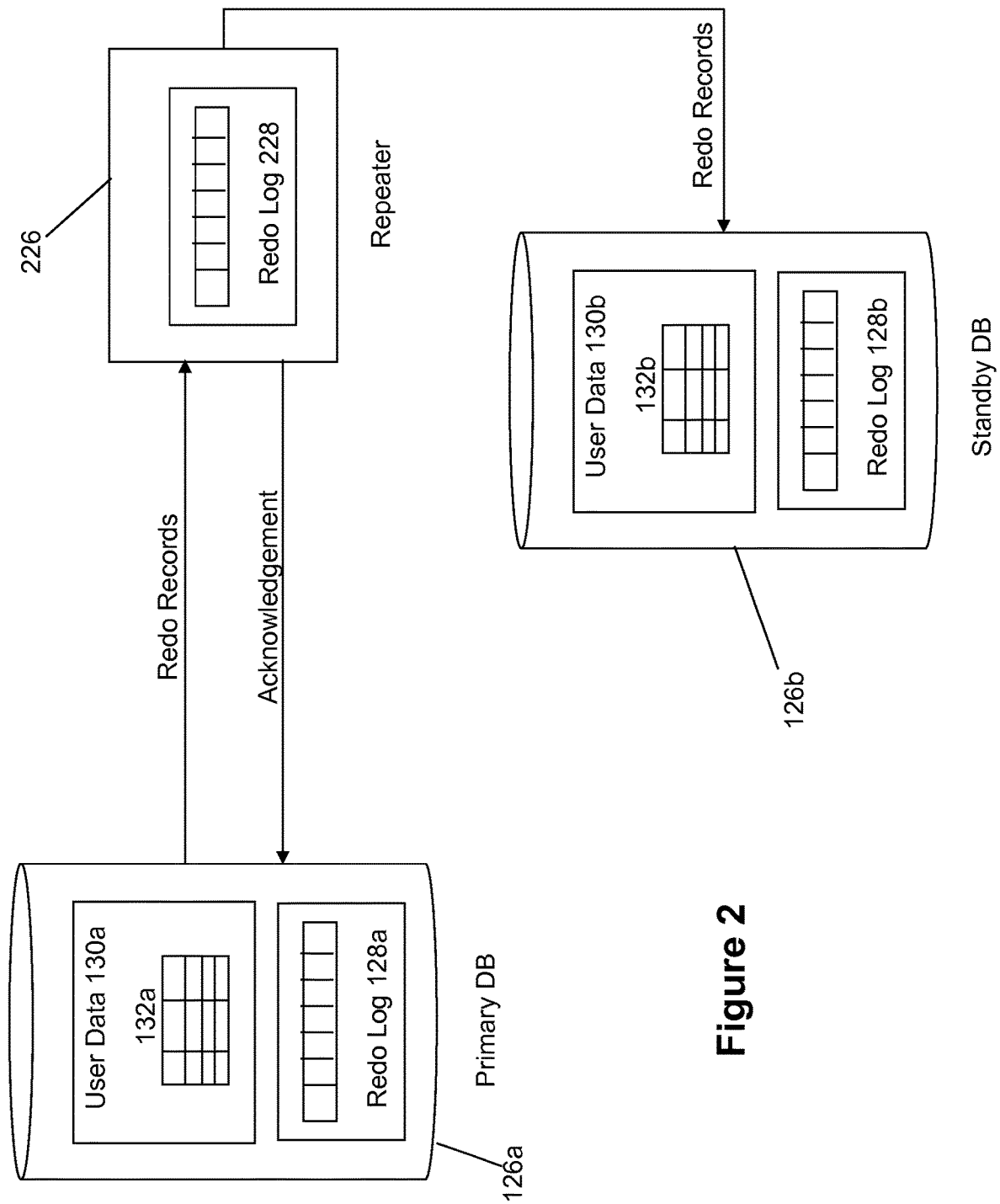
FIG. 2 illustrates a system to implement a Repeater and standby database according to embodiments of the invention.

FIG. 2 provides an illustration of a configuration that includes a Repeater. The primary database 126a will ship redo records to a redo log 228 at the Repeater 226 instead of directly to the standby database 126b. A Repeater 226 is not a duplicate of a standby database 126b, but is instead a lightweight database instance that does not need to include the entirety of the user data 130b. Therefore, setting up a Repeater 226 is very quick and easy since none of the data in a database residing in tables 132b has to be configured at the Repeater 226. Instead, the Repeater only needs to include a structure to hold redo records (e.g., redo log 228) along with additional related control and/or metadata files.

When the primary database 126a executes transactions and generates redo records, those redo records will be transmitted to the Repeater 226. The transactions at the primary 126a will wait for the redo records to be received by the Repeater 226 before they receive acknowledgement of commits. Only after receiving this acknowledgement will the transaction be permitted to commit.

The Repeater 226 should be geographically positioned relatively closely to the primary database 126a to reduce the network latency between the primary database 126a and the Repeater 226, e.g., at a distance that is less than the local disk latency. Since the Repeater 226 is relatively close to the primary 126a, the network latency should be less than the local disk latency which means the network I/O should complete before the local disk I/O so servicing the Repeater 226 should bear no (or minimal) impact on transactional performance of the primary database 126a.

Figure 1B:
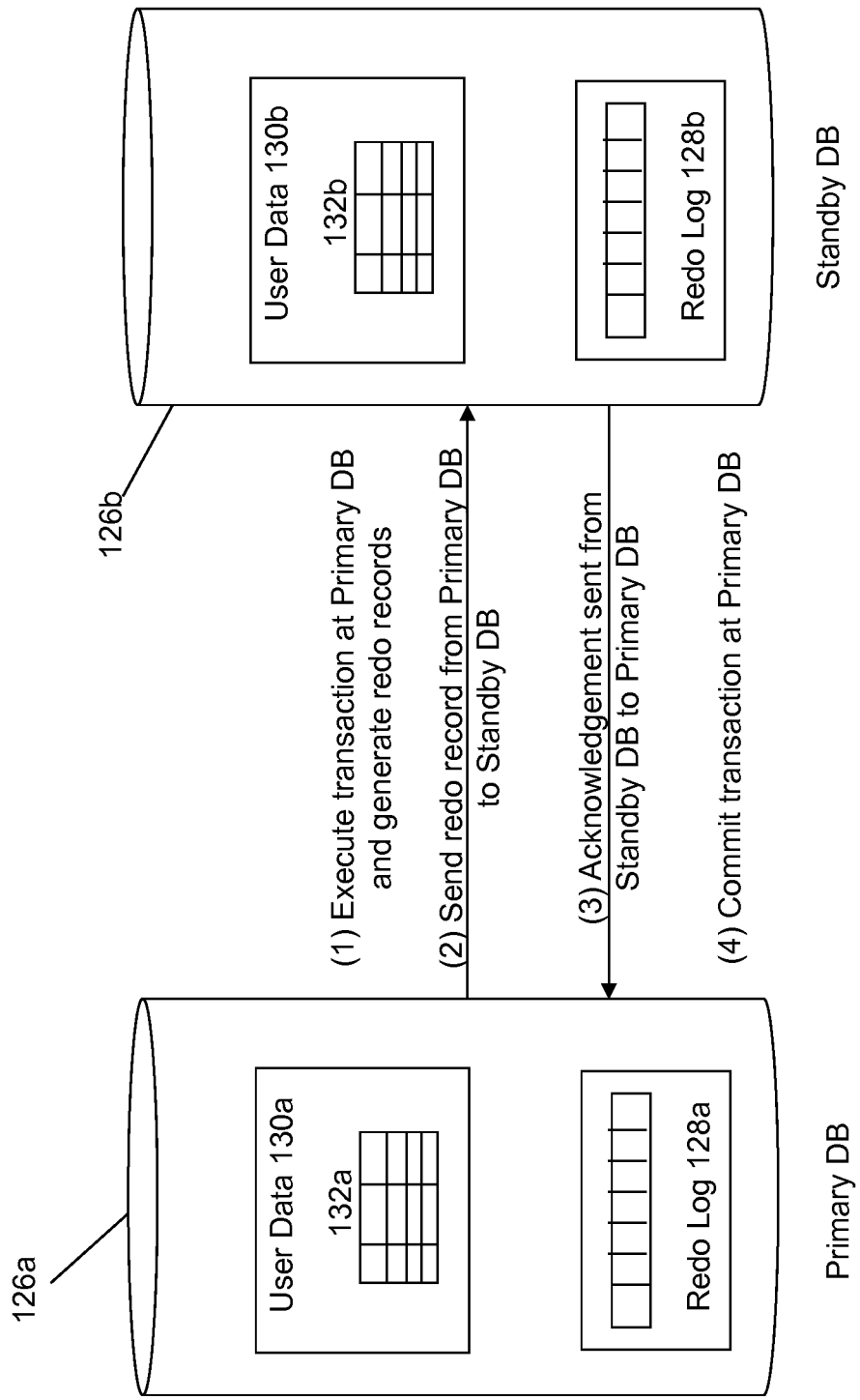

This provides an advantage over the approach of FIG. 1B, since the network latency is significantly smaller. This is because the primary 126a and standby 126b databases are normally located relatively distant to one another; the large distance between the primary and the standby exists for a number of different reasons, including the desire to ensure that a single point of failure (e.g., a common power outage or weather problem) does not affect both the primary and the standby or the need to accommodate the existing locations of a company's data centers that may be geographically spread across the world. This large amount of geographic distance between the primary and the standby creates a large network latency if the approach of FIG. 1B is taken, which is significantly reduced using the present approach since the Repeater 226 can be located relatively close to the Primary (with the distance selected to achieve acceptable network latency), while still allowing the standby databases to be located in much more remote locations.

At this point, all committed redo will reside both on disk in the redo log (e.g., in an online redo logs or "ORL") at the primary 126a and at the Repeater 226 (e.g., in a standby redo log or "SRL"). The Repeater 226 in turn will forward the redo records it receives directly out of the SRL 228 to the remote terminal destinations or possibly multiple destinations, such as to one or more standby databases 126b.

In the event of a catastrophic failure of the primary database, the Repeater 226 will be instrumental in achieving a no data loss failover to a selected target standby. At the time of the failure, all committed redo will be preserved at least at the Repeater site if not at the target standby as well. When a failover commences, the Repeater 226 will ship all remaining redo that has not yet been received at the target standby 126*b* after which point the target standby 126*b* can execute a no data loss failover and become the new primary.

The present approach therefore provides an advantage over the approach illustrated in both FIGS. 1A and 1B. This is because the approach of FIG. 1A may result in a data loss in the event of a failure, and the present approach will have the committed redo records at either the Repeater 226 or the Standby databases 126*b*, ensuring that no data will be lost even if a failure occurs at the primary 126*a*. This can be achieved while achieving faster performance and/or efficiency as compared to the FIG. 1B approach, since the proximity of the Repeater 226 to the Primary 126*a* can be selected to minimize network latency.

In some configurations, sessions connected to a database and which are executing transactions will generate redo records in a shared memory (which may be referred to as a "log buffer". A background process (e.g., a background log writer process) may be used to periodically write out the redo records from the log buffer to online redo logs at the Primary and to ship the same redo records to the Repeater. In this configuration according to some embodiments, sessions are free to generate subsequent redo records as long as there is space in the shared memory allocated for redo generation, even if the background process has not yet written the previous redo records, except when session commits. When sessions commit, a special redo record is generated that is referred to herein as the "commit redo record". The commit redo record describes a change to the transaction table in the database to indicate that the transaction has committed, and is generated in the log buffer. Sessions that issue a commit wait for the background process to acknowledge that the redo records at least until the "commit redo record" have been written to the online redo log. With a Repeater, the issuance of the commit may include waiting for shipping of the redo records to a Repeater and acknowledgement by the Repeater as well.

This configuration where sessions generate redo records in a log buffer and the background process operates in parallel to write the redo records to online redo log at Primary as well as shipping the redo to a Repeater (and waits for acknowledgement) is designed to maximize throughput of the system. The sessions do not block (and continue to generate redo as needed) until they issue the commit.

Figure 3:
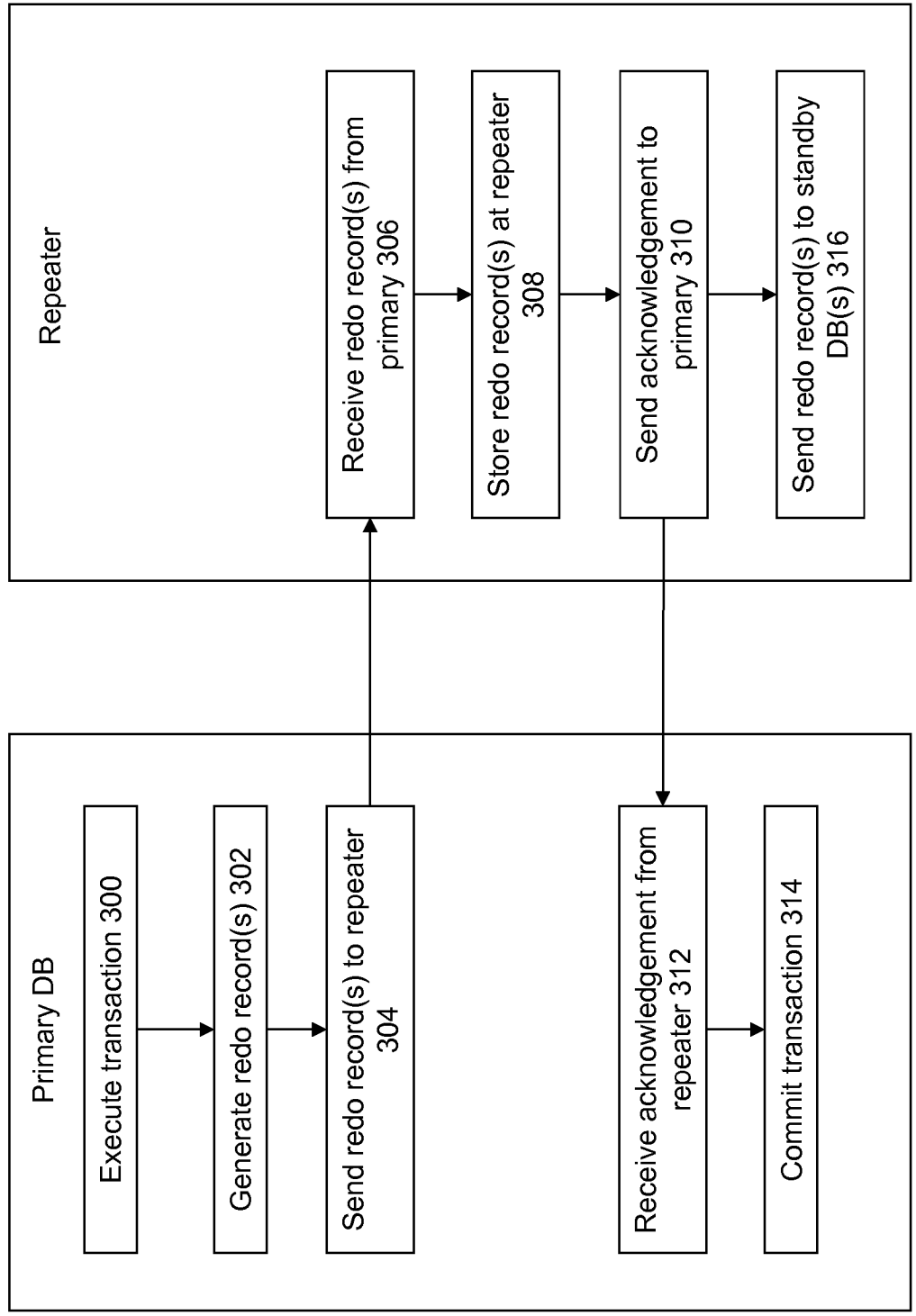
FIG. 3 illustrates a flowchart of an approach according to embodiments of the invention.

FIG. 3 illustrates a flowchart of the actions taken at the Primary and Repeater according to some embodiments of the invention. At 300, the transaction is executed at the primary. The transaction may take actions that affect one or more data items within user data at the primary database. Executing the transaction results in the creation of redo records at the primary (302).

In some embodiments, if a transaction is a very small transaction, then it is possible that both the redo record for the changes to whatever tables that were modified plus a "commit redo record" are written and shipped in the same batch of redo records that a background log writer process services—e.g., at the same time as the commit redo record. The session is blocked until the background log writer process informs the session that the redo record has been both written to the online redo log and shipped to the Repeater as well as acknowledged by the Repeater. Therefore, before the session executing the commit is acknowledged of the commit, redo records modified by the transaction that are needed to replicate the data at the standby would have been sent from the primary to the Repeater (304). In some alternate embodiments that do not employ this configuration, step 304 is implemented such that before a commit occurs for the transaction, the redo records are sent from the primary to the Repeater.

At the Repeater, the redo records are received from the primary (306). The redo records are stored within a redo log (e.g., as standby redo log) at the Repeater (308). An acknowledgement can thereafter be sent from the Repeater to the Primary (310). Thereafter, the Repeater can re-transmit the redo records to one or more terminal destinations (316). These terminal destinations include one or more standby databases.

At the Primary, the acknowledgement is received at 312. In some embodiments, there is no need for transactions to wait until previous redo records have been shipped before deciding on commit, since the act of committing generates the commit redo record, and transactions wait at that time for the background log writer process to acknowledge that all redo records prior and including the commit redo record has been written to online redo at the Primary and shipped to the Repeater and acknowledged by Repeater. In some alternate embodiments, once the acknowledgement is received, the transactions can be committed. This commit can occur even though the redo records have not yet been distributed to any terminal destinations.

Figure 4A:
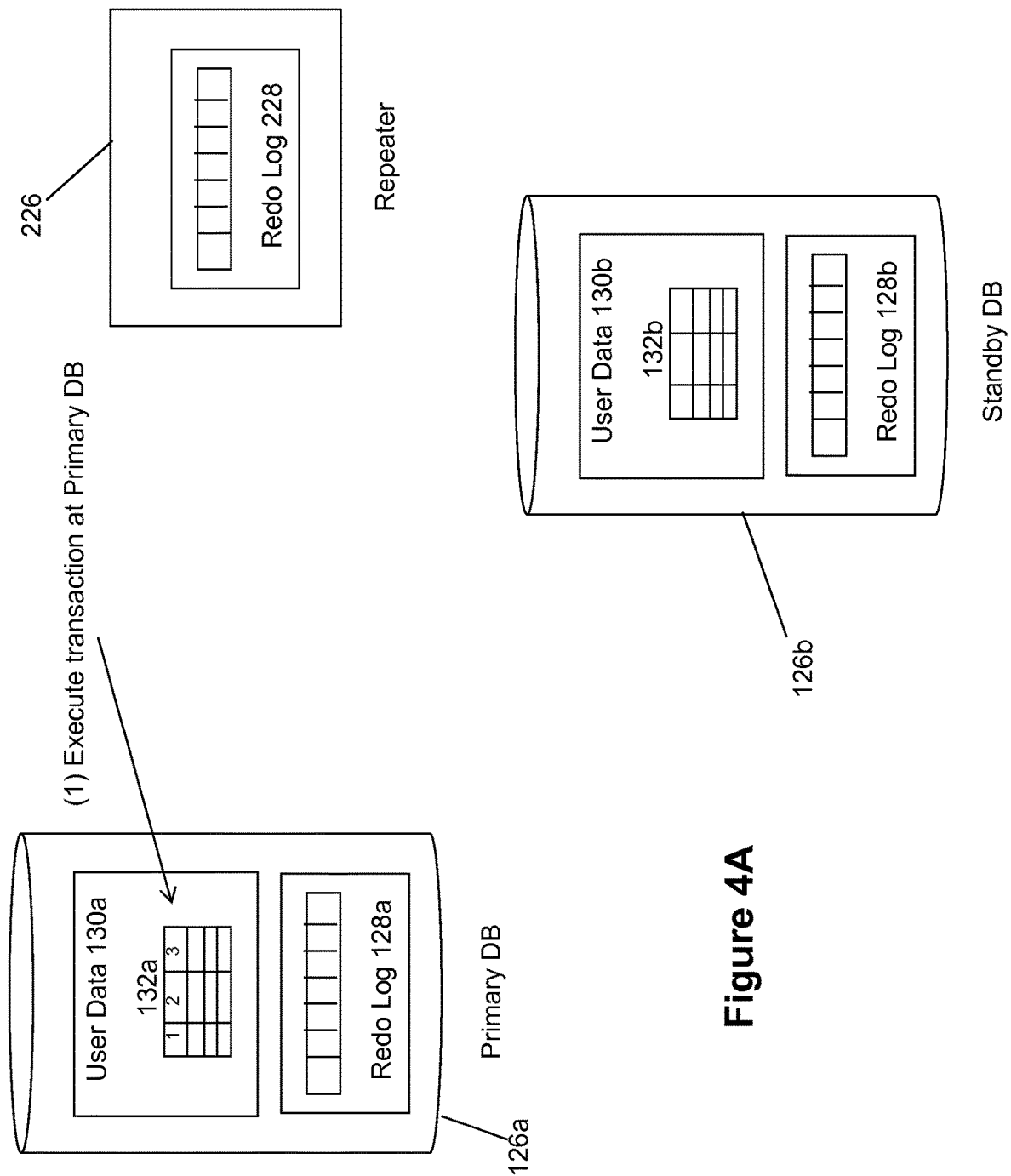
FIGS. 4A-H illustrate use of a Repeater according to embodiments of the invention.

FIGS. 4A-H provide an illustrative example of this process. FIG. 4A shows a primary database 126*a*, a Repeater 226, and a standby database 126*b*. The primary database 126*a* includes a set of user data 130*a* having one or more database tables 132*a*. The primary database 126*a* also includes a redo log 128*a* to hold redo records that are generated for transactions that act upon the user data 130*a*.

Figure 4B:
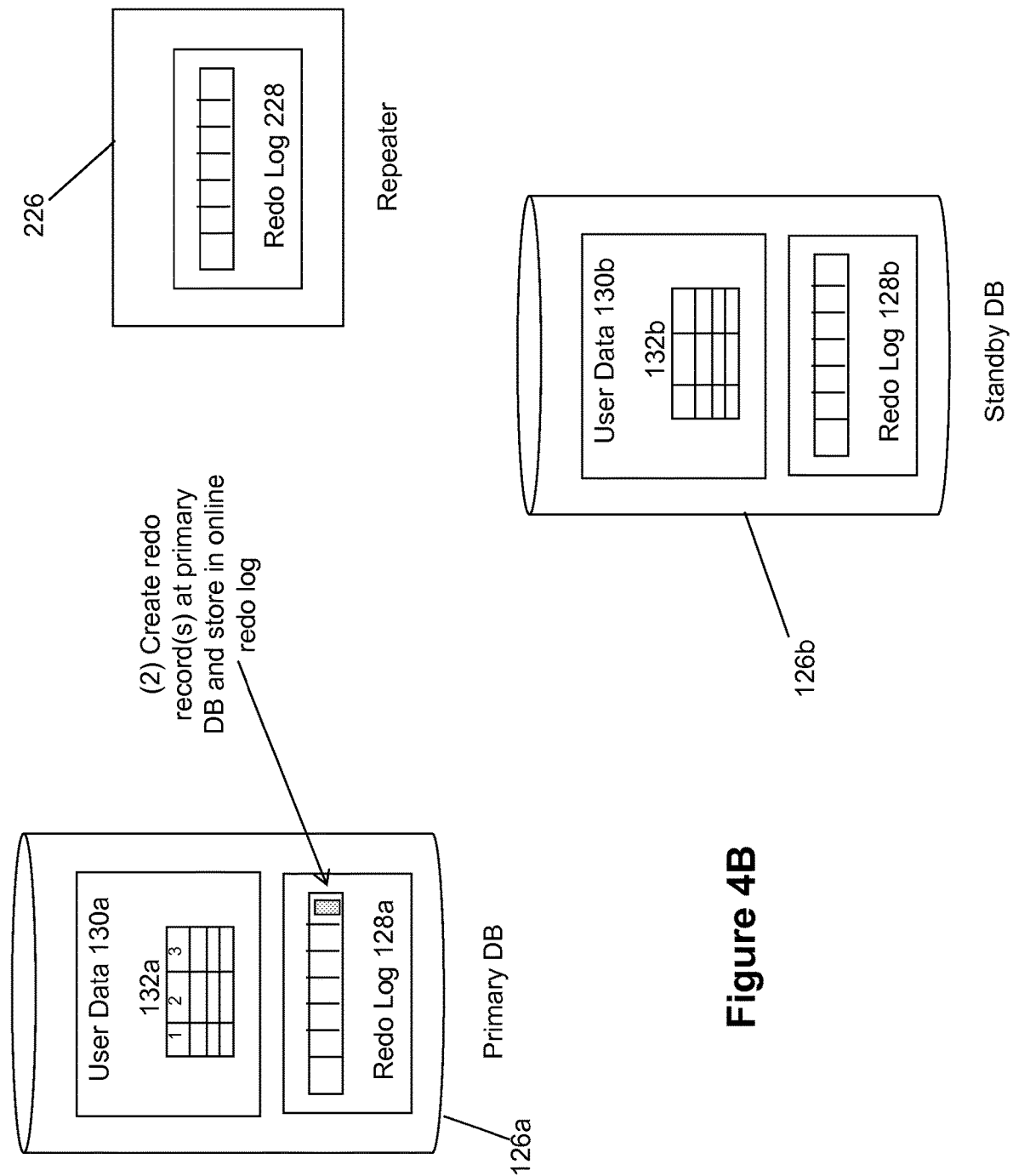

Assume that in FIG. 4A, a transaction is executed at the primary database which modifies the data within table 132*a*. As shown in FIG. 4B, redo records would be generated at the primary database corresponding to the changes made by the transaction against the table 132*a*. The redo records would include a set of redo having the appropriate sequence and content to recreate the changes that were made to the table 132*a* by the transaction. These redo records would be stored within the redo log 128*a*.

Figure 4C:
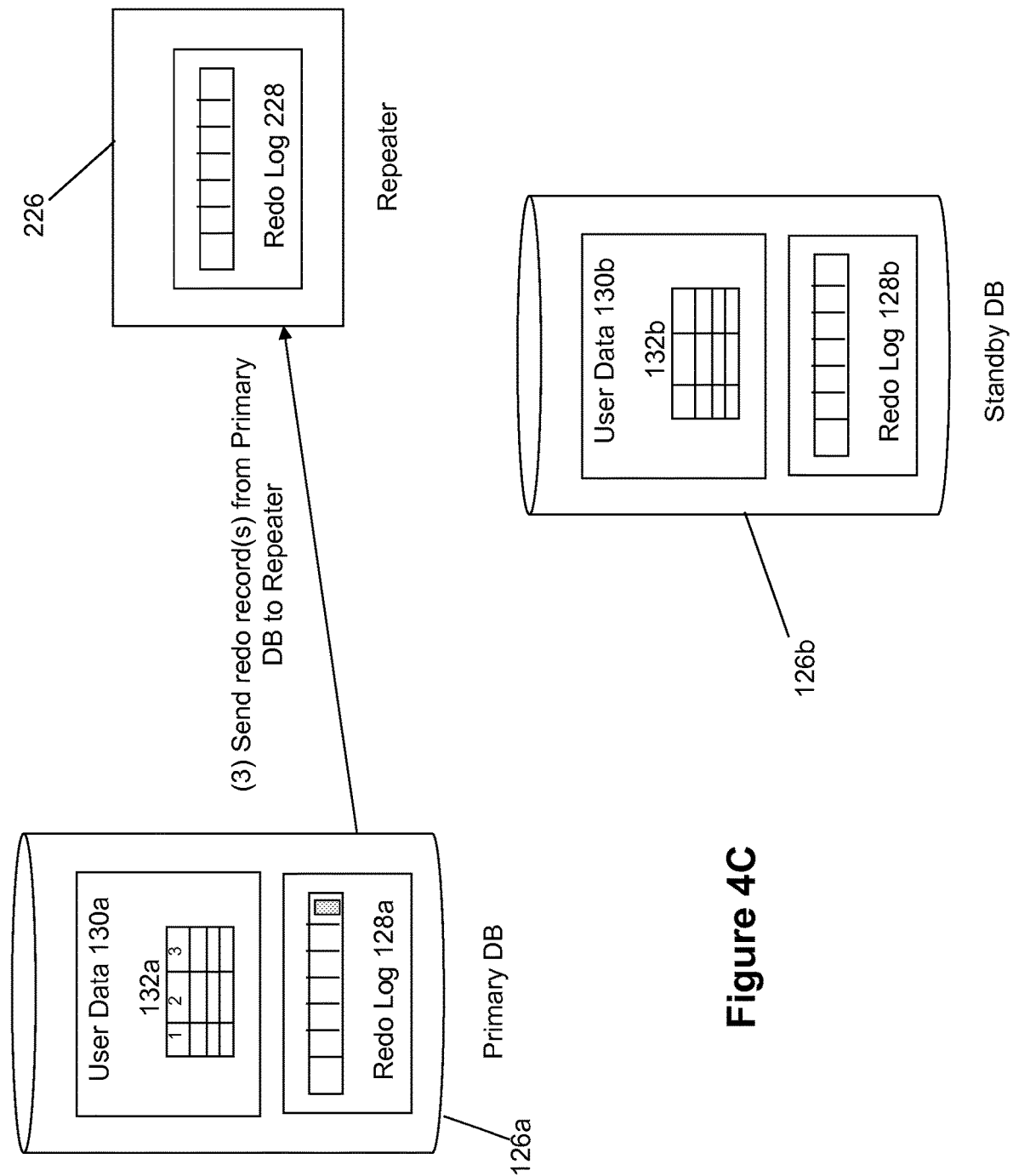
Figure 4D:
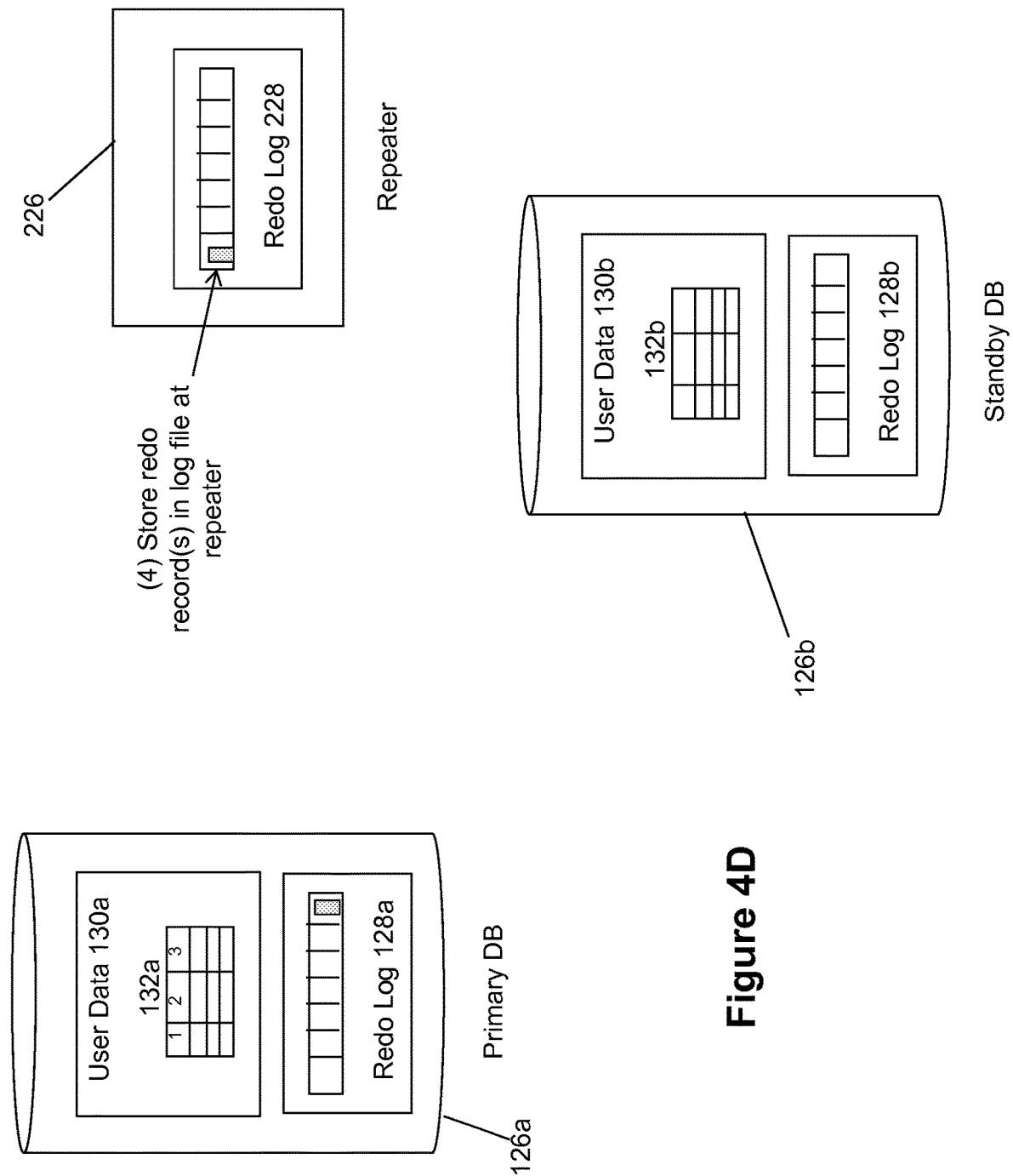
Figure 4E:
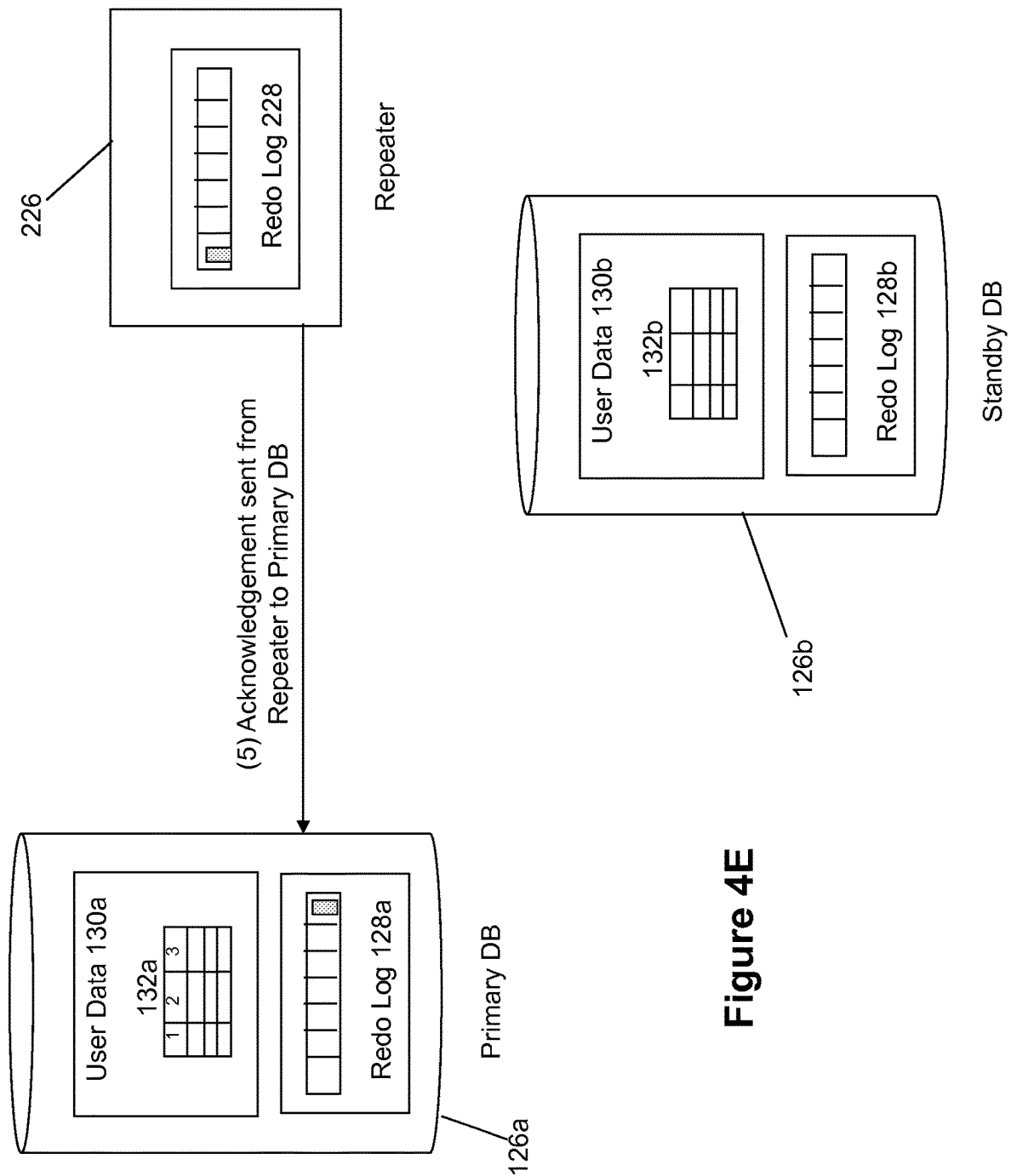

Next, as shown in FIG. 4C, a copy of the redo record(s) is sent from the primary database 126*a* to the redo repeater 226. The redo records are being sent prior to a commit of the transaction at the primary database 126*a*. FIG. 4D shows the redo records being stored within a redo log 228 at the Repeater 226. Since the Repeater now has a copy of the redo records, an acknowledgement can now be sent from the Repeater 226 to the primary database 126*a*, as shown in FIG. 4E.

Figure 4F:
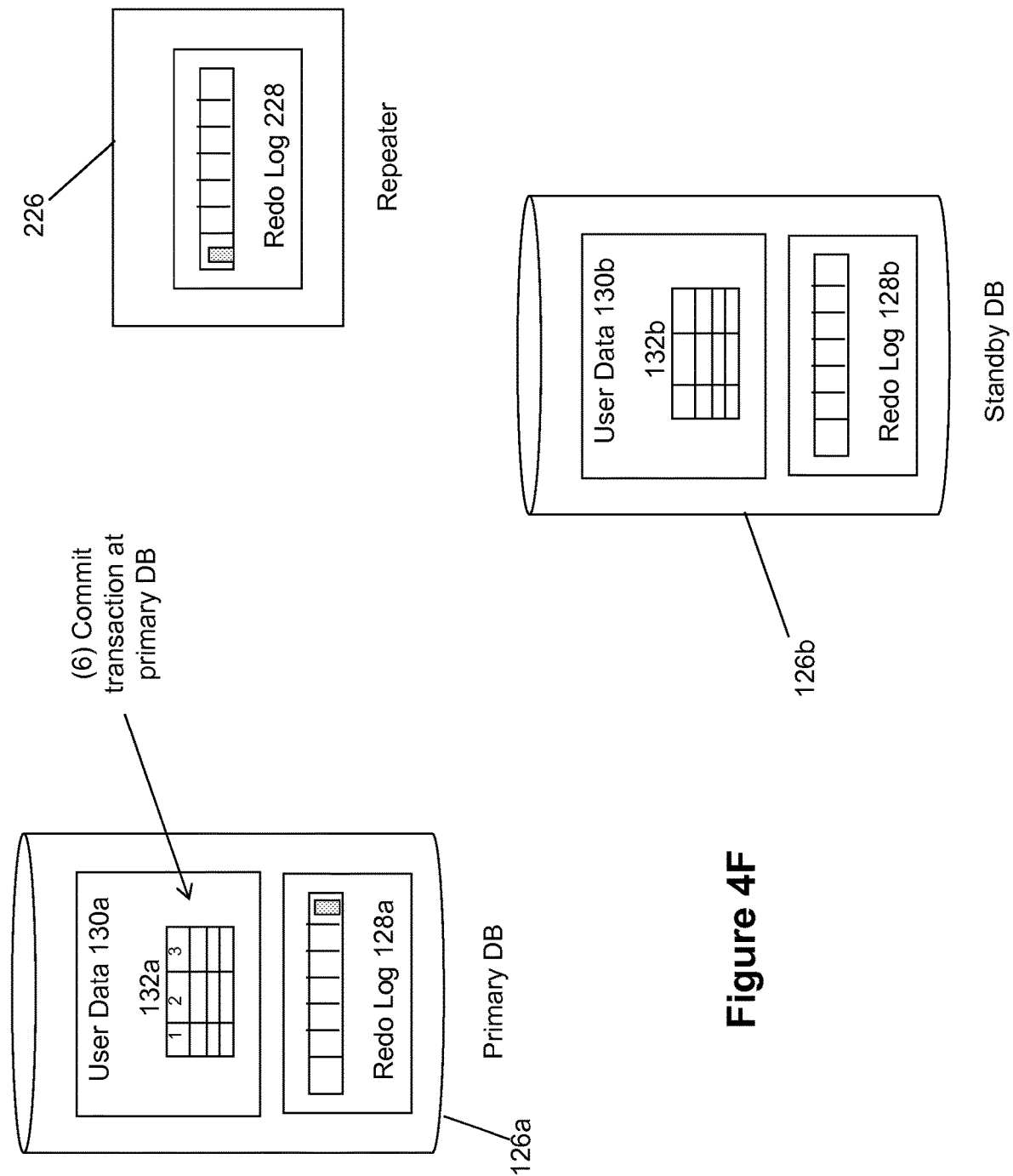

As shown in FIG. 4F, the transaction at the primary database 126*a* can now be committed. At this point, even if a failure occurs at the primary database, there is sufficient redundancy to permit other entities to provide access to the results of the executed and committed transaction. This means that no data loss will occur even in the event of a total failure of the primary database 126*a*.

Figure 4G:
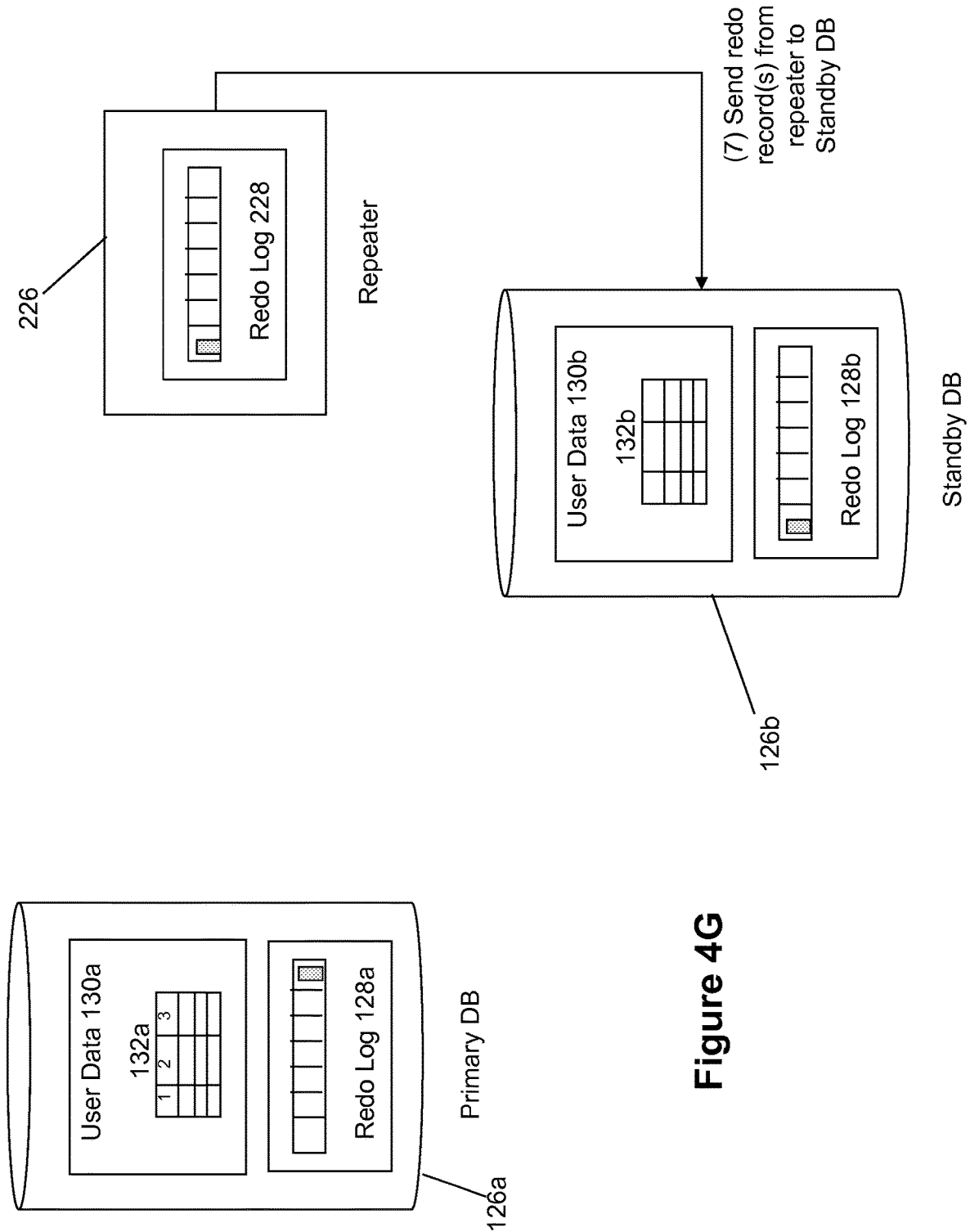

At some point, the Repeater 226 will forward the redo records to terminal destinations. As shown in FIG. 4G, the redo records form the redo log 228 are sent from the Repeater to one or more standby databases 126*b*. The redo records are stored in a standby redo log 128*b* at the standby database 126*b*.

Figure 4H:
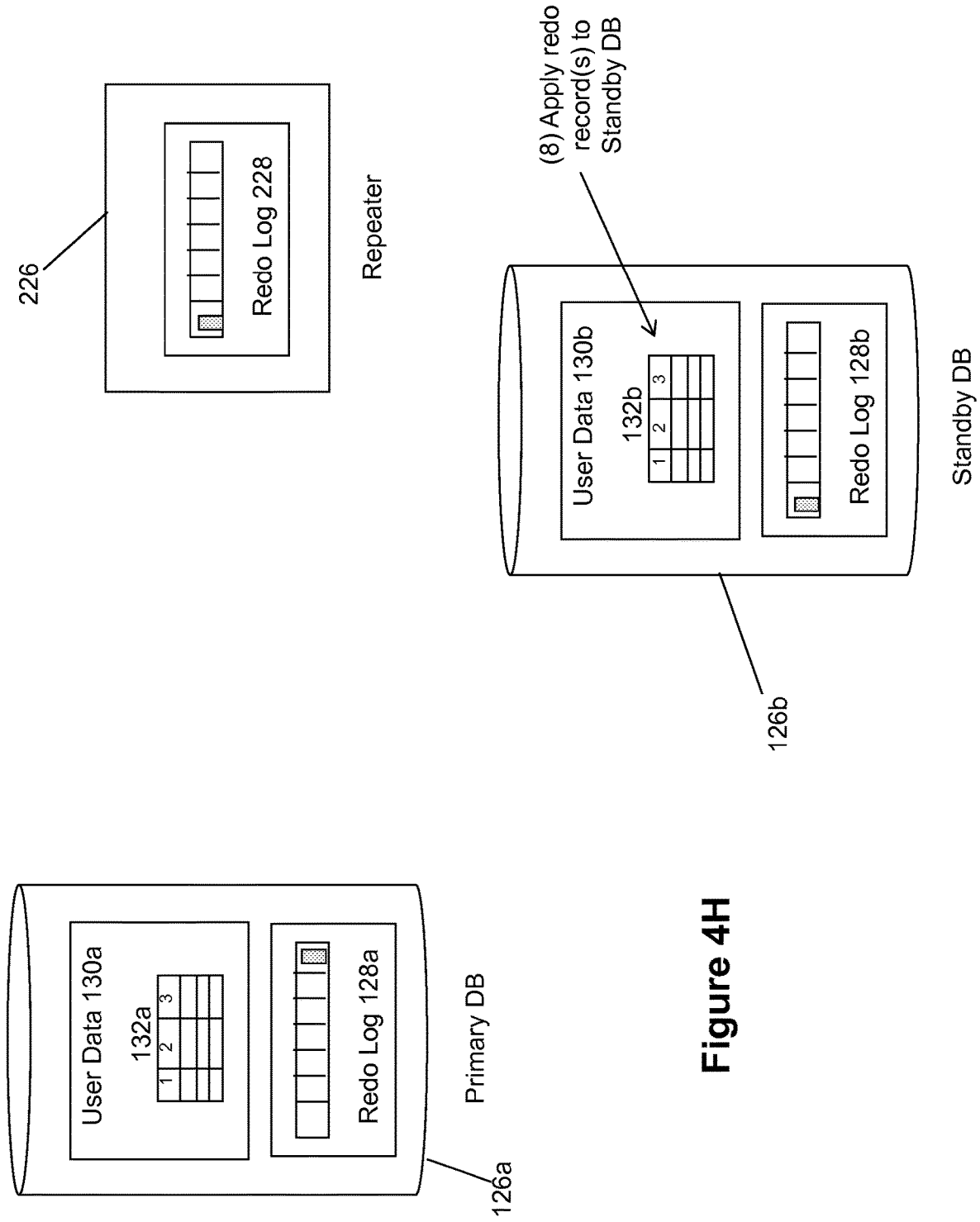

The standby database 126*b* includes a copy 130*b* of the user data, including a copy of the table 132*b* that was modified by the original transaction. As shown in FIG. 4H, the redo records within the redo log 128*b* can be applied to the copy 132*b* of the database table to replicate the changes that were made by the transaction at the primary database 126*a* to the standby database 126*b*. At this point, synchronization has occurred between the primary database 126*a* and the standby database 126*b*.

Figure 5:
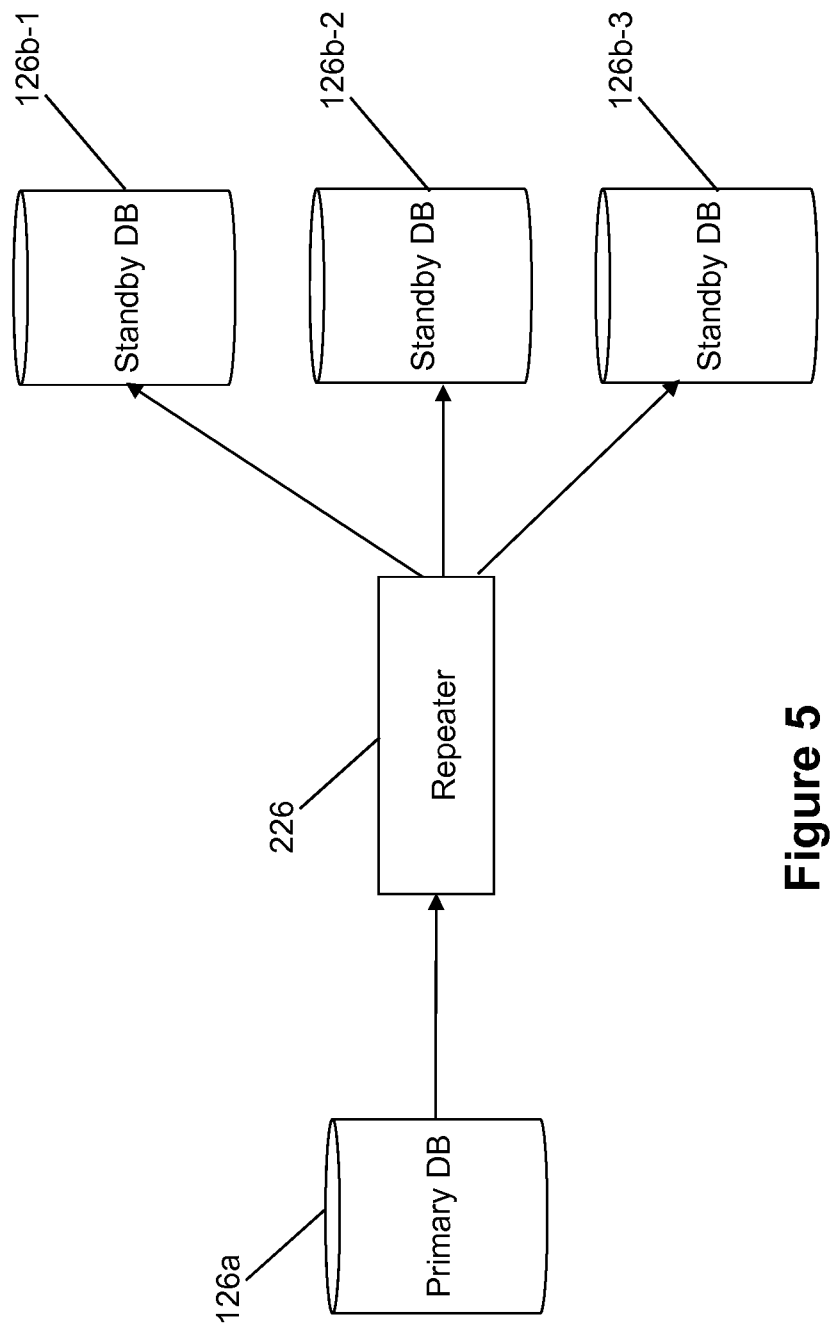
FIG. 5 illustrates a Repeater servicing multiple standby databases according to embodiments of the invention.

FIG. 5 illustrates another advantageous use mode provided by the Repeater. The resources needed to support a standby database will create an impact on the performance of the entity that services the standby databases. Therefore, if there is a need for a primary database 126*a* to directly support multiple standby databases 126*b*-1, 126*b*-2, and 126*b*-3 (without a Repeater 226 being present), a significant amount of resources at the primary site are consumed, with the amount of resources needed to service the standby databases increasing as the number of standby databases increases. The approach of FIG. 5 allows the burden of servicing multiple standby databases 126*b*-1, 126*b*-2, and 126*b*-3 to be lifted from the primary database 126*a* and placed instead on the Repeater 226. When a Repeater 226 is employed to offload the burden of servicing remote destinations from the primary, those resources are once again available for application processing at the primary 126*a*.

Figure 6:
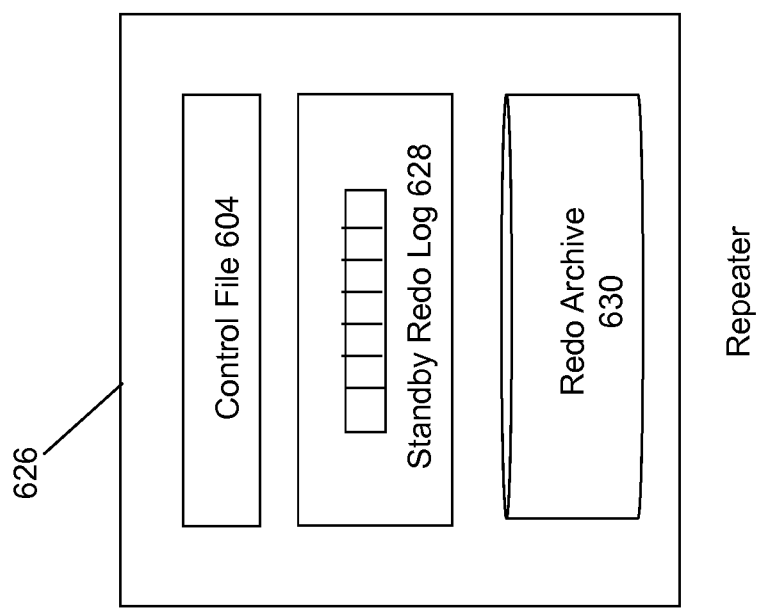
FIG. 6 illustrates an architecture of a Repeater according to embodiments of the invention.

FIG. 6 illustrates the contents of an example Repeater 626 according to some embodiments of the invention. Repeater 626 includes a control file 604, a redo log 628, and a redo archive 60. As previously discussed, the redo log 620 stores the redo records that are transmitted from the primary database. The redo archive is provided on a persistent storage device (e.g., on a disk drive) as a location to hold redo records that cannot fit within the space of the redo log 628.

The control file 604 includes the metadata and other data items that control the operation of the Repeater 626. For example, the control file includes information to identify whether and where specific log files are located, e.g., the location and contents of the redo archive and the standby redo logs.

The control file also holds data regarding the redo records that have been stored at the Repeater and that have been forwarded to the standby databases. This type of information is useful for many purposes. For example, this type of information is useful to perform "gap analysis" of the redo records at the standby databases. To explain, consider if a given standby database has undergone a failure. During the time in which the standby database is down, it is possible that it is will miss the reception of redo records that should have otherwise been transmitted from the Repeater to the standby database. Therefore, when that standby database is brought back up, gap analysis can be performed to determine if there are any gaps in the sequence of redo records at the standby database. This analysis is performed by checking the information about the redo records at the Repeater against the redo records at the standby. If there are any missing redo records at the standby, then the standby can acquire the missing redo records, e.g., from the redo archive at the Repeater.

What is notable about the contents of the Repeater is that is that unlike a standby database, the Repeater does not need to include the user data. Therefore, the Repeater is a very lightweight entity as compared to the standby database. This permits the Repeater to be set up very efficiently since none of the data in a database residing in tables has to be restored at the Repeater.

As described above, the Repeater provides a special instance that accepts redo from the primary database and then ships it to other standby databases, similar to a cascading standby database. Unlike a regular standby database, a Repeater does not have user data files and does not apply redo.

Notably, a Repeater can extend zero-data-loss protection to its cascaded destinations and effectively extend the distance of a "SYNC" destination. It is noted that the SYNC relationship only needs to extend between the primary and the Repeater in order to retain the zero data loss protection. As between the Repeater and the terminal destinations, those relationships may be either SYNC or ASYNC. In some embodiments, it is also possible for a primary to service a Repeater via ASYNC if high performance is more important than no data loss.

Figure 7C:
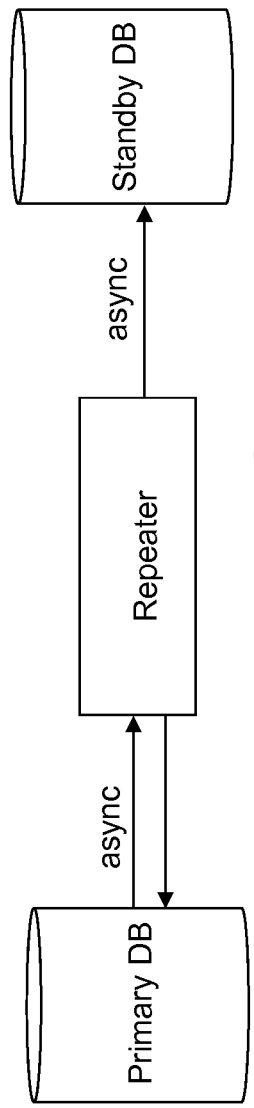

FIGS. 7A-D illustrate these example configurations. FIG. 7A shows the configuration in which a SYNC relationship exists between the primary and the Repeater, an ASYNC relationship exists between the Repeater and the standby. In this approach, an acknowledgement needs to be sent from the Repeater to the primary that acknowledges successful receipt of redo records for a committed transaction at the Repeater, but no such acknowledgement is needed for the transmission of the redo records from the Repeater to the standby database. FIG. 7B shows the alternate approach in which a SYNC relationship exists both between the primary and the Repeater and the Repeater and the standby. In this approach, an acknowledgement needs to be sent from the Repeater to the primary that acknowledges successful receipt of redo records for a committed transaction at the Repeater, and a similar acknowledgement is needed for the transmission of the redo records from the Repeater to the standby database.

Figure 7D:
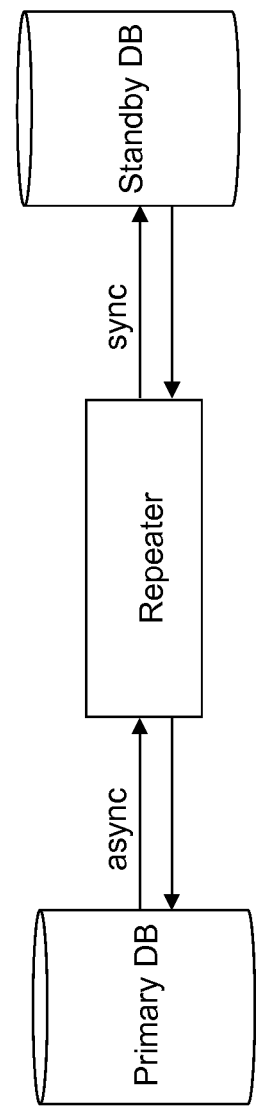

The embodiments of FIGS. 7C and 7D are employed if high performance is more important than providing no data loss. FIG. 7C shows the configuration in which an ASYNC relationship exists between the primary and the Repeater, and in which an ASYNC relationship also exists between the Repeater and the standby. FIG. 7D shows another approach in which an ASYNC relationship exists between the primary and the Repeater, and in which a SYNC relationship exists between the Repeater and the standby.

The SYNC and ASYNC destination attributes refer to the network transport mode. At the destination nodes, "AFFIRM" and "NOAFFIRM" configurations can be implemented to provide a similar concept for the disk I/O. The AFFIRM configuration implements synchronous disk I/O to the standby redo log while the NOAFFIRM configuration implements asynchronous disk I/O. With NOAFFIRM, waiting does not occur for the disk I/O to complete at the standby before acknowledgement is provided for receipt of the redo back to the primary. In contrast, the AFFIRM configuration will cause additional latency because a wait period is instituted for the disk I/O to complete at the standby before acknowledgement is provided for receipt of the redo back to the primary. Either approach can be used in combinations with the network SYNC and ASYNC configurations. For example, either SYNC AFFIRM or SYNC NOAFFIRM can be employed as valid configurations for the primary-repeater relationship.

With SYNC NOAFFIRM, since the local I/O (e.g., local disk I/O to locally store redo at the primary) and the remote network I/O (e.g., to send redos and receive acknowledgement of receipt from the standby) are performed in parallel, if the repeater network latency is less than the local primary disk latency, there should be no impact on primary performance when a standby database is added to the configuration. However, if the network latency is greater than the local primary disk latency (e.g., in the situation where a primary is directly communicating with a standby at a geographically remote location or if the repeater is geographically distant from the primary), the addition of a no data loss configuration will impede transaction performance of the primary database.

With SYNC AFFIRM, since the I/O will occur at both the local primary and destination sites, the network latency may impact the primary performance. In some configurations, it is possible for the network latency to be negligible in terms of perception to the application or small enough to only minimally affect performance. Therefore, the location of the repeater should be selected to minimize to this type of network latency impact, e.g., by selecting a location that is geographically close to the primary but still far enough away to avoid having both the repeater and the primary subject to the same single point of failure. Since this selected location for the repeater is still likely to be closer to the primary than the location of the standby, this provides a performance improvement over the traditional no data loss approach of directly having the primary communicate redos to the standby.

As noted above, a Repeater that is used to extend the distance of a SYNC destination should be geographically close to the primary database, because the primary has to use SYNC transport mode to ship redo to the Repeater. Therefore, a Repeater that is appropriately located relative to a first database may not be a feasible Repeater for a second database since it is too far away from the second database.

For this reason, some embodiments of the invention provides for the concept of a conditional Repeater. A conditional Repeater is a Repeater which can be configured to act as a Repeater only if the appropriate database (e.g., one that is located geographically close to the conditional Repeater) has been designated as the primary database. If a change in status occurs such that a new primary database is selected, then it is possible that a new (conditional) Repeater will be used in conjunction with the new primary database.

Figure 8:
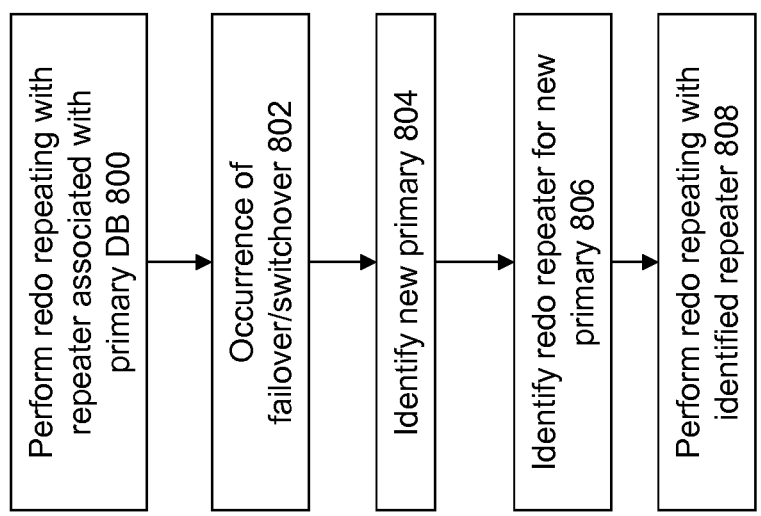
FIG. 8 shows a flowchart of a process for changing Repeaters according to some embodiments of the invention.

FIG. 8 shows a flowchart of a process for changing Repeaters according to some embodiments of the invention. This process assumes that the system configuration includes a current primary database and a current Repeater. At 800, redo repeating is being performed by the current Repeater to forward redo records from the current primary to the current standby databases.

At 802, detection occurs of a change in the identity of the primary database. This may occur, for example, because the primary has undergone a failure, and a failover is performed to make a standby database into the new primary database. This may also occur, for example, for a planned switchover of the role of the primary from one database to another. Therefore, at 804, identification is made of the new primary database.

At 806, identification is made of the Repeater that will be associated with the new primary database. This is determined in some embodiments by configuring Repeaters as conditional Repeaters that assume the role of Repeaters for given primary databases. One possible approach to make this type of configuration is by determining the geographic proximity of the conditional Repeaters to the different databases, where Repeaters that are located near the proximity of a database will be designated as the Repeater for that database. The closer the Repeater to its primary database, the less network latency is likely to exist between the two nodes. However, the location of the Repeaters should be selected to be distant enough from its corresponding database such that they will not share a common failure condition which will foreseeably impact both of them. For example, it would likely not make sense to select a Repeater that is located close to its primary such that both share the same power source or network station, since it is foreseeable that a problem with the primary's power source or network station will also take down a Repeater that shares the same power source or network station.

At 808, the redo repeating is thereafter performed by the identified Repeater for the new primary. It is noted that the same Repeater may end up as the Repeater for both the old and the new primaries, e.g., if the old primary and the new primary are within the same data room. It is also possible that a new primary will result in selection of a new Repeater, e.g., if the new primary is geographically distant from both the old primary and the old Repeater, and a new Repeater is needed to minimize the network latency between the new primary and the Repeater.

Figure 9A:
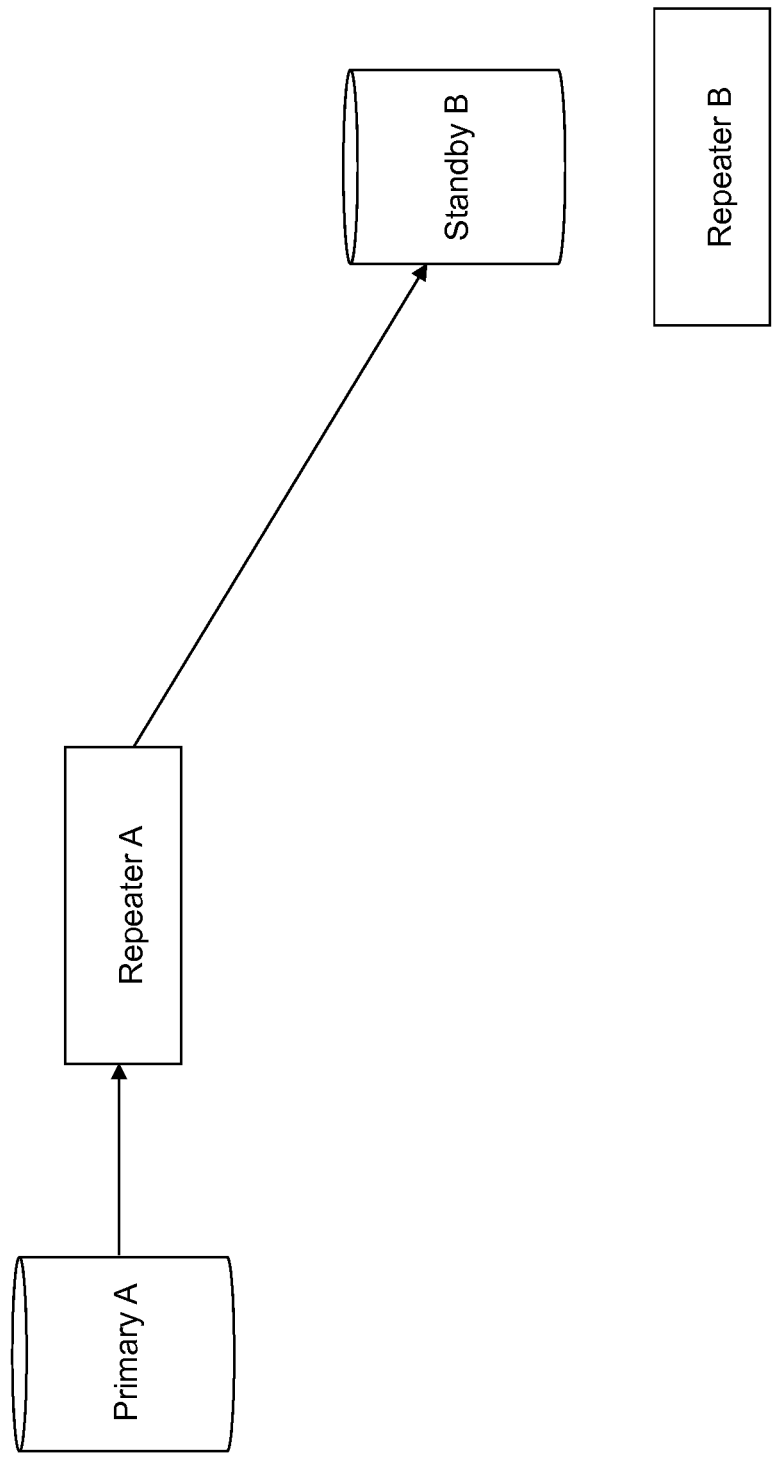
Figure 9C:
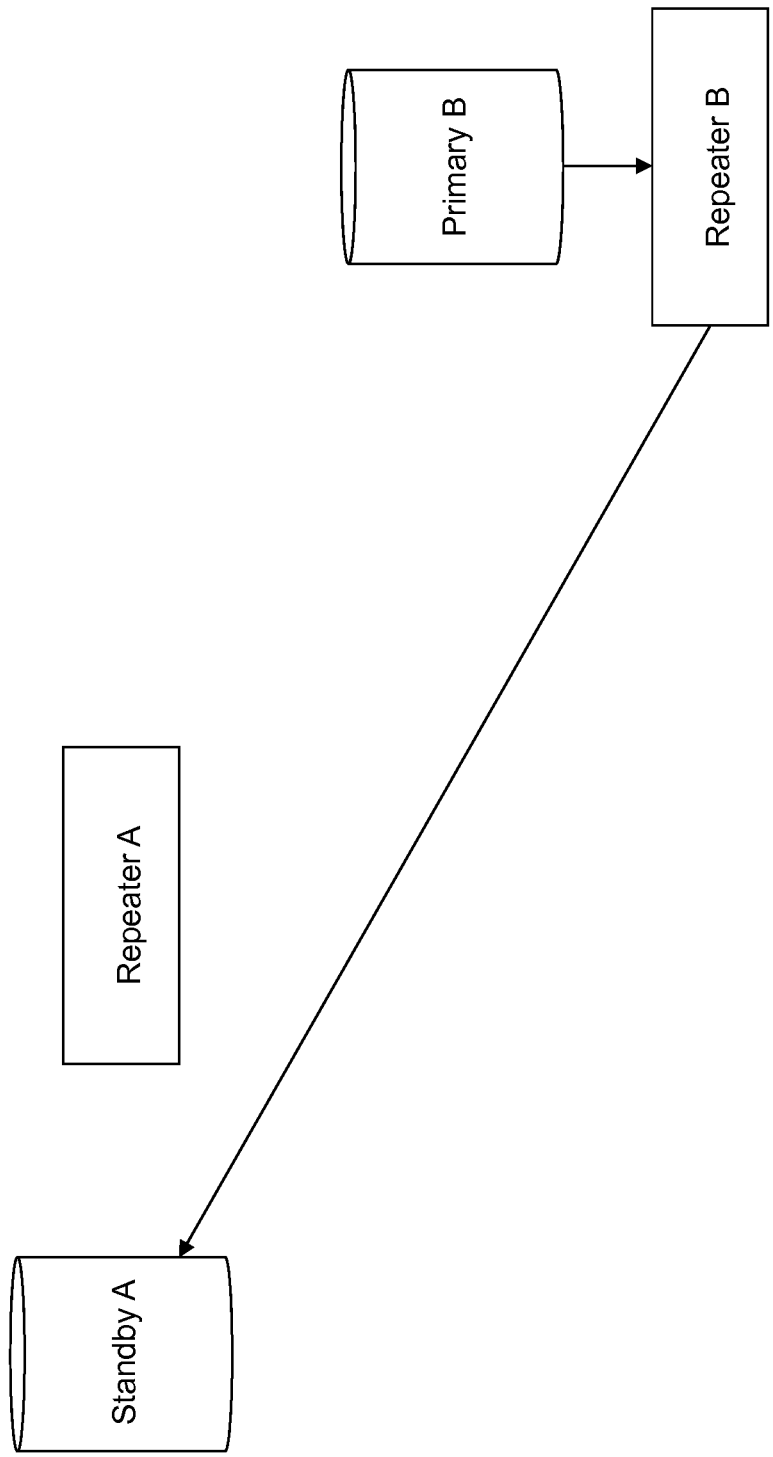

FIGS. 9A-C illustrate this process. FIG. 9A shows the situation where database A is the primary and is currently associated with a Repeater A. Any redo records sent from the primary A to the Repeater A are forwarded to standby database B. It is assumed that database A is geographically distant from standby B, but is relatively near Repeater A. Repeater A is also geographically distant from standby B. Repeater B is geographically distant from primary A, but is relatively near standby B.

Assume that a switchover occurs, as shown in FIG. 9B. In this example situation, database A switches from its current role as primary to its new role as a standby. Database B switches from its current role as a standby to its new role as the primary.

At this point, as change in Repeaters becomes necessary, since the distance between the old Repeater A and the new primary B is distant enough to introduce excessive network latency. Therefore, as shown in FIG. 9C, Repeater B becomes the Repeater for the new primary database B. This minimizes network latency since Repeater B is located geographically near new primary database B.

The conditional Repeaters may be configured in any suitable way. In some embodiments, conditional Repeaters are configured by implementing a configuration data structure that identifies specific associations between Repeaters and primary databases.

Figure 10A:
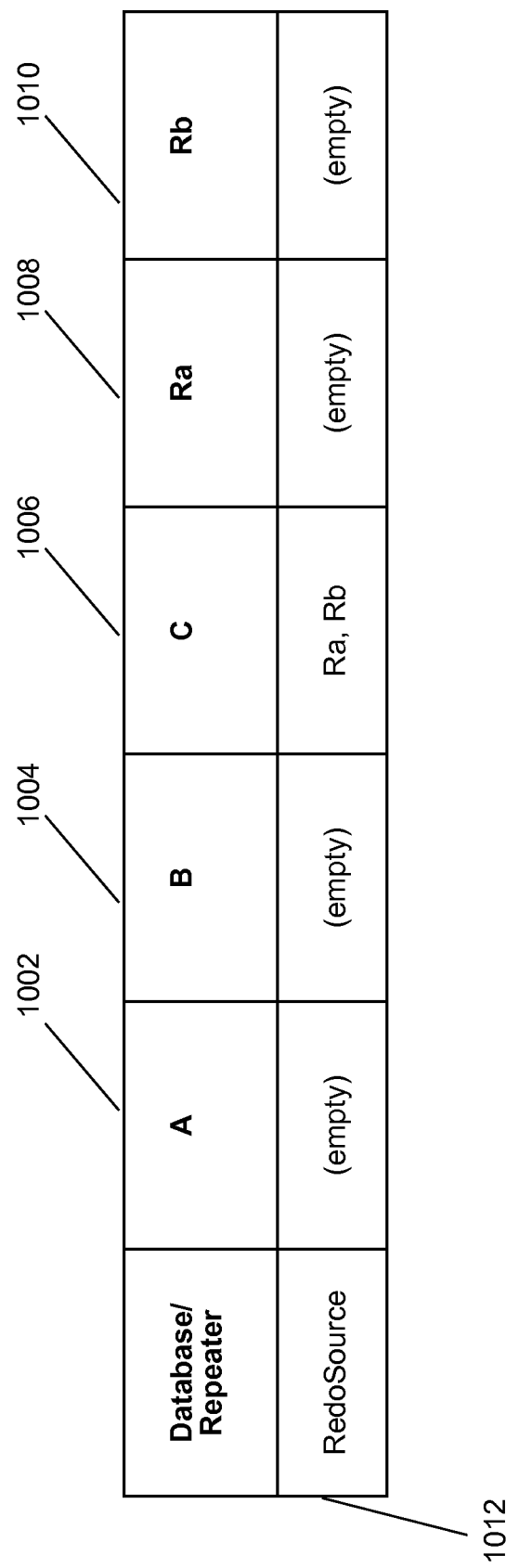
FIGS. 10A-10C and 11A-11C provide illustrative examples of configurations for Repeaters according to embodiments of the invention.

FIG. 10A illustrates an example structure that can be used to configure conditional Repeaters. Each column in this structure is associated with a different database or Repeater. Column 1002 is associated with database A, column 1004 is associated with database B, column 1006 is associated with database C, column 1008 is associated with Repeater Ra, and column 1010 is associated with Repeater Rb.

The RedoSource row 1012 identifies the source of redo records for the entity that is associated with a column. The RedoSource property has a different meaning on a Repeater than on a regular database in this table. A Repeater always receives redo from the current primary. However, if a Repeater's RedoSource has a non-empty list of databases, only when one of the databases specified in its RedoSource is the current primary database, should the Repeater relay redo (from the current primary database). In other words, a non-empty RedoSource value makes a Repeater conditional. If a Repeater's RedoSource property is empty, this Repeater is always allowed to relays redo from the current primary. If there are multiple RedoSource values, then they are selected in order to be the source of the redo.

In the current example, A, B and C are three databases and Ra and Rb are two Repeaters. The RedoSource values for databases A and B and for Repeaters Ra and Rb have been left empty. However, the RedoSource value for database C is (Ra, Rb).

Figure 10B:
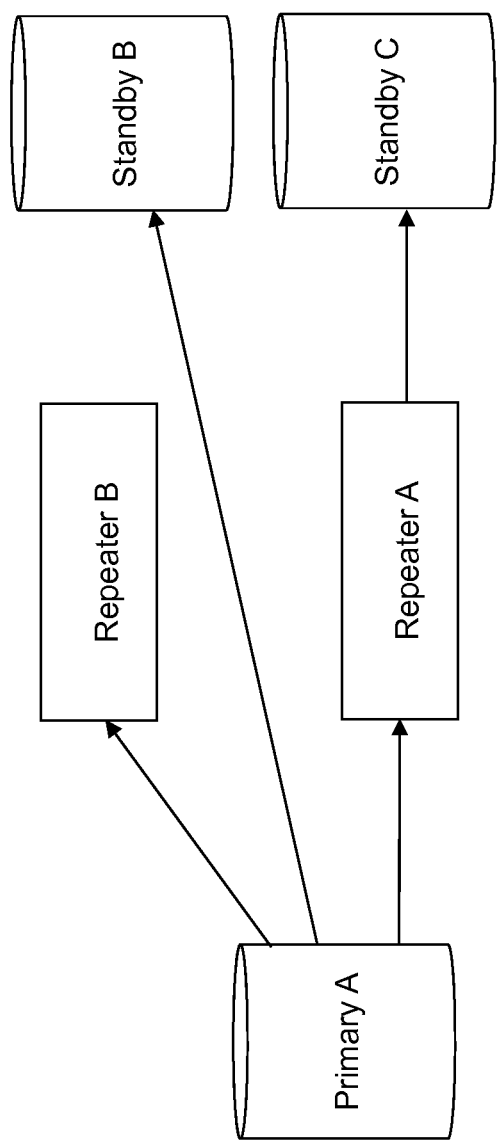

In this setting, Ra and Rb are both non-conditional Repeaters, since they are always allowed to relay redo from the primary no matter which database is the primary. If database A is the primary, the redo shipping diagram would be as shown in FIG. 10B, where primary A would be associated with both Repeaters Ra and Rb. However, redo records are only sent from Repeater Ra to standby database C, since the table in FIG. 10A indicates that the RedoSource value for C includes either Ra or Rb, and in some configurations the fact that Ra is listed first would indicate that it is used as the redo source for C. Since the RedoSource value for B is left empty, this means that it will directly receive redo records from the primary A.

Figure 10C:
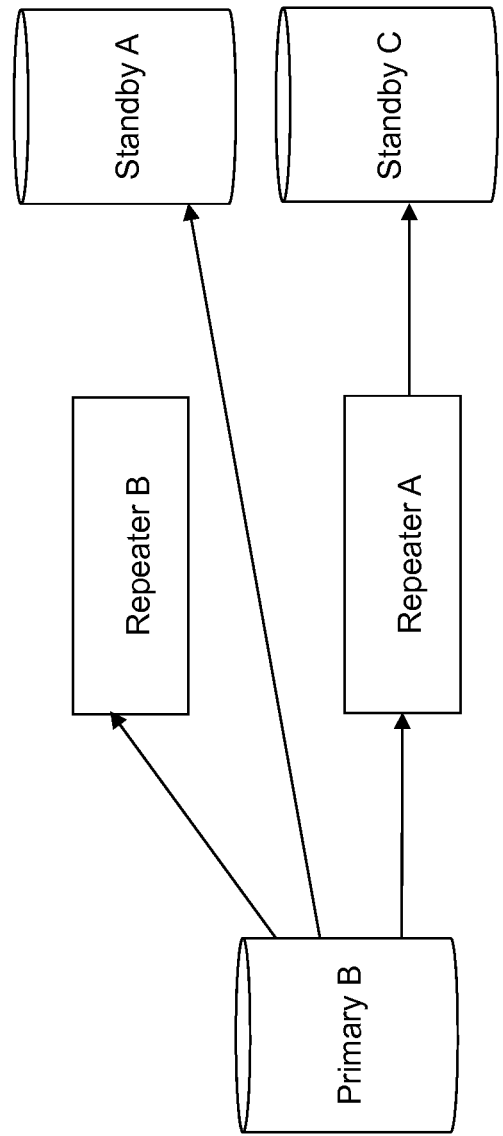

If database B is the primary, the redo shipping diagram would be as shown in FIG. 10C, where primary B would also be associated with both Repeaters Ra and Rb. However, redo records are only sent from Repeater Ra to standby database C, since the table in FIG. 10A indicates that the RedoSource value for C includes either Ra or Rb, and in some configurations the fact that Ra is listed first would indicate that it is used as the redo source for C. Since the RedoSource value for A is left empty, this means that it will directly receive redo records from the primary B.

A conditional Repeater becomes a Repeater if it has a non-empty RedoSource property value and it only relays redo when one of the databases specified in RedoSource property is the current primary database.

Figure 11A:
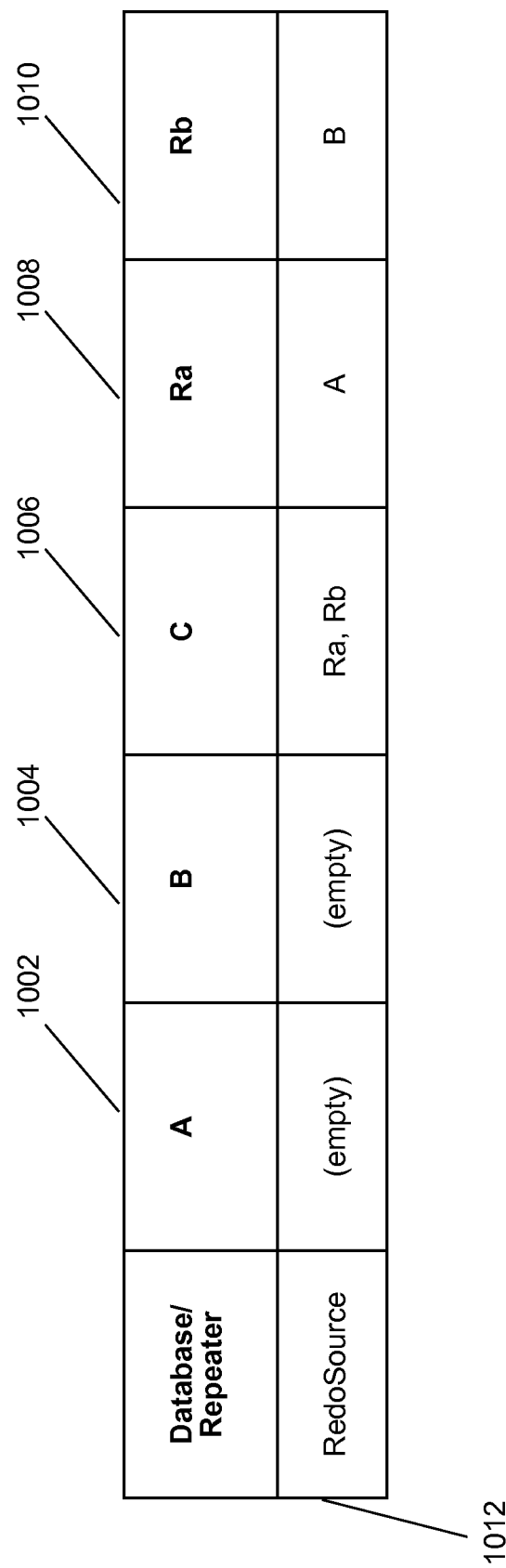

An example of this situation is shown in FIG. 11A, which illustrates a similar structure as before in which column 1002 is associated with database A, column 1004 is associated with database B, column 1006 is associated with database C, column 1008 is associated with Repeater Ra, and column 1010 is associated with Repeater Rb. The difference is that the RedoSource row 1012 now has different values for the columns associated with Repeaters Ra and Rb. Specifically, the RedoSource value for Ra is now A and the RedoSource value for Rb is now B.

Figure 11B:
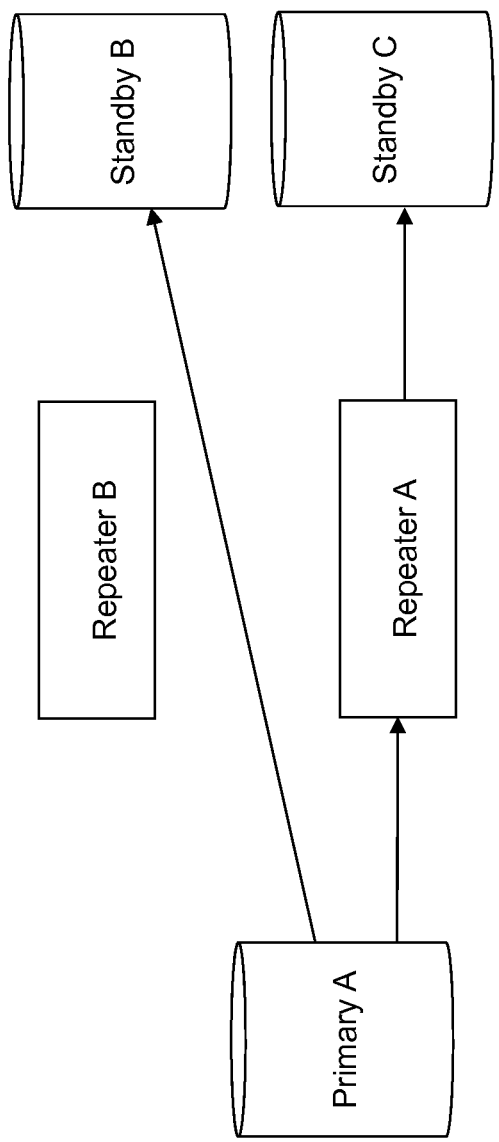

Therefore, Ra and Rb are now both designated as conditional Repeaters. They are allowed to relay redo from only the primary that is specified as the RedoSource for that Repeater. If database A is the primary, the redo shipping diagram would be as shown in FIG. 11B, where primary A would be associated with only Repeater Ra. Therefore, redo records are only sent from Repeater Ra to standby database C. Since the RedoSource value for B is left empty, this means that it will directly receive redo records from the primary A.

Figure 11C:
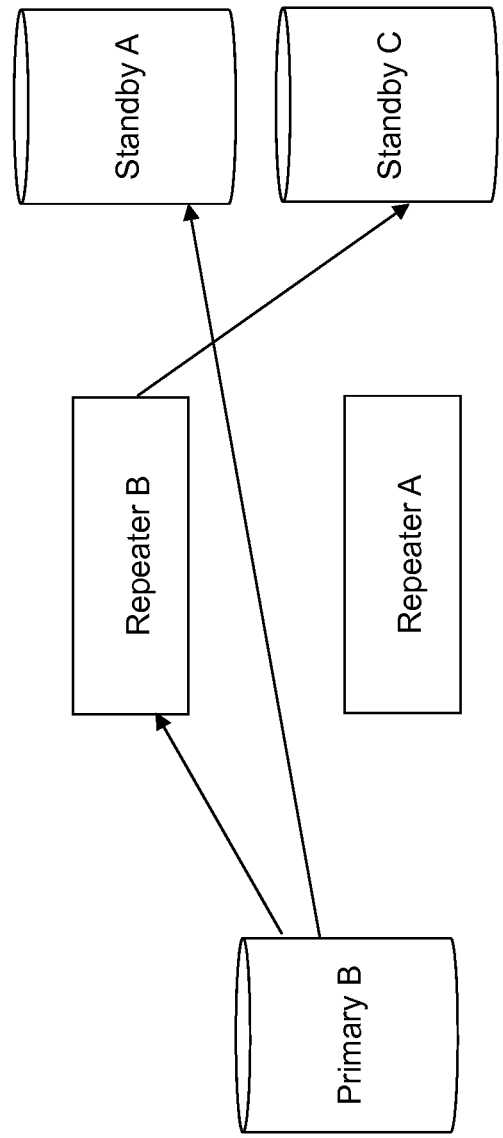

If database B is the primary, the redo shipping diagram would be as shown in FIG. 11C, where primary B would be associated with only Repeater Rb. Therefore, redo records are only sent from Repeater Rb to standby database C. Since the RedoSource value for A is left empty, this means that it will directly receive redo records from the primary B.

Figure 12A:
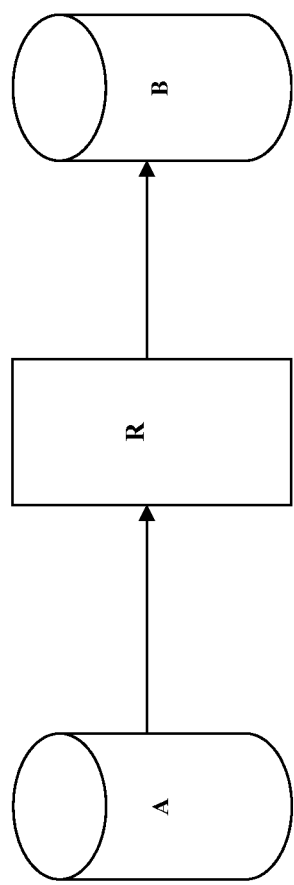
FIGS. 12A-12D illustrate configuration examples for Repeaters according to embodiments of the invention.

In some embodiments, switchover and failover to a Repeater is not permitted. However, users can switchover or failover to a standby database that receives redo from a Repeater. After switchover/failover, the redo shipping path still follows the values of RedoSource as configured. For example, FIG. 12A illustrates a redo shipping diagram of a data guard broker configuration before the role change. In this configuration, A is the primary database, R is a Repeater, and B is a physical standby database who receives redo from the Repeater, thus it has its RedoSource property set to R. After "switchover to B" action, B becomes the primary and A becomes a physical standby database. Depending on what is the database A's value for RedoSource property, the redo shipping diagram would be different.

Figure 12B:
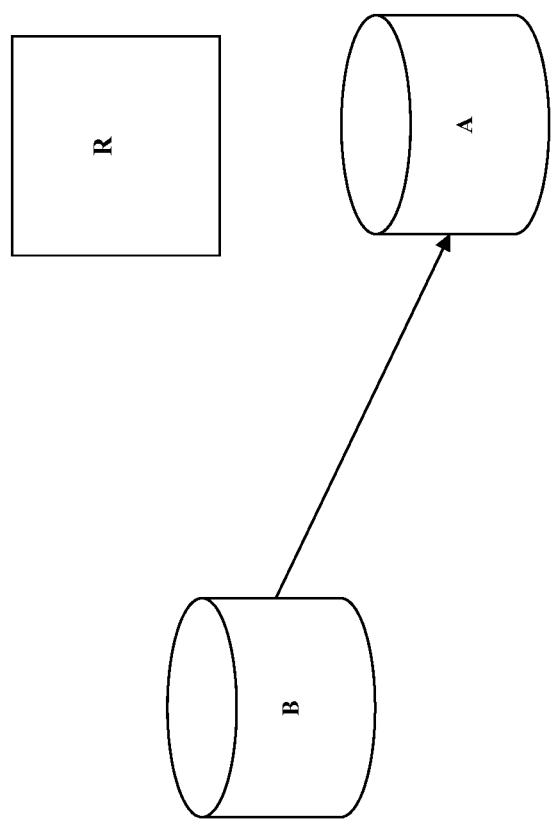
Figure 12C:
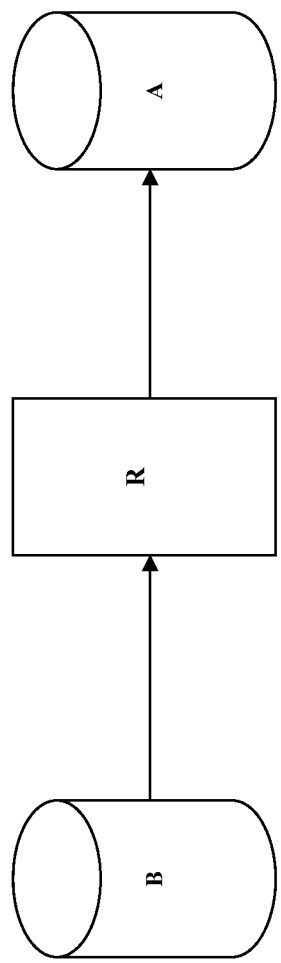

If database A's RedoSource is empty, it receives redo directly from database B and the redo shipping diagram would appear as shown in FIG. 12B, which shows the Redo shipping diagram after switchover to database B, and where the RedoSource value of database A is empty. If database A's RedoSource is also set to Repeater R, it then receives redo from R and the redo shipping diagram appear as shown in FIG. 12C, which shows the switchover to database B and where the RedoSource value of database A is set to R. Failover operations follow almost the same behavior except that the old primary (and some bystanders) would perform reinstatement immediately after failover.

Fast-start failover (FSFO) is supported with Repeater as well, where users can set the fast-start failover target to be a standby database that receives redo from a Repeater. After a FSFO happens, the old primary will be automatically reinstated by the observer and the redo shipping diagram will follow the same rule according to RedoSource settings. Using conditional Repeaters, it is possible to configure one Repeater for each FSFO partner. For example, in the configuration shown in FIGS. 12D, A and B are FSFO partners that are far apart and each has a Repeater (Ra and Rb respectively), and database C always receives redo from the Repeater of the current primary.

Figure 12D:
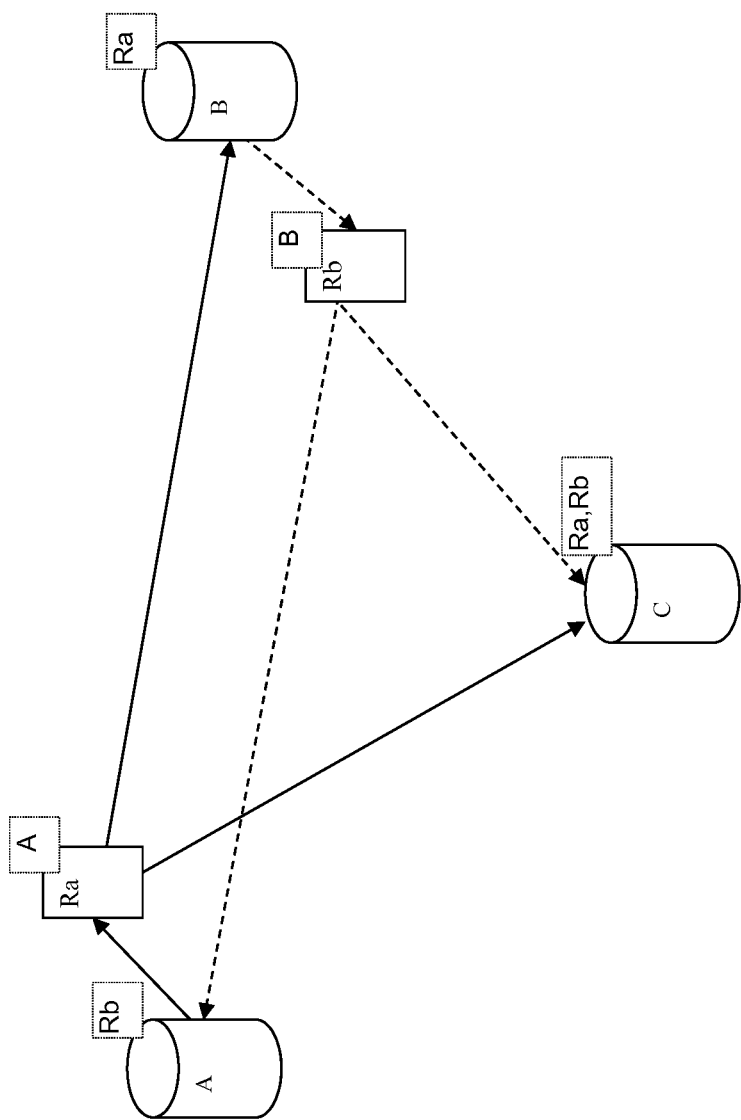

In FIG. 12D, the dotted box at top right corner of each database and Repeater is the RedoSource value of that database and Repeater. When database A is the primary database, Repeater Ra is allowed to relay redo because its RedoSource is A, and Repeater Rb is not allowed to relay redo because its RedoSource is B. So Repeater Ra receives redo from database A and ships it to database B and C. Since Repeater Rb is not allowed to relay redo, primary database A does not ship redo to Rb. When database B becomes the primary database (through FSFO or switchover), Repeater Rb is then allowed to relay redo because its RedoSource is B and Repeater Ra cannot relay redo anymore because its RedoSource is A. So Repeater Rb receives redo from database B and ships it to database A and C. Note that the RedoSource value of database C is a list of Repeaters, but it only receives redo only from one of them. Database C could be a typical reader farm standby that always receives redo from a Repeater. A Repeater will always be viable (do not require reinstatement) after a failover. This is possible because a Repeater does not apply redo. In order to prevent a Repeater's cascaded destinations to receive stale redo from the Repeater, the failover and reinstate operation would need to pre-register the new primary's branch information.

The redo Repeater can also be operated in an "alternate repeater" configuration. In these embodiments, the alternate Repeater is configured to be a backup to a primary Repeater, placed into service to perform redo repeating operations in the event of a problem with the primary Repeater.

Figure 13A:
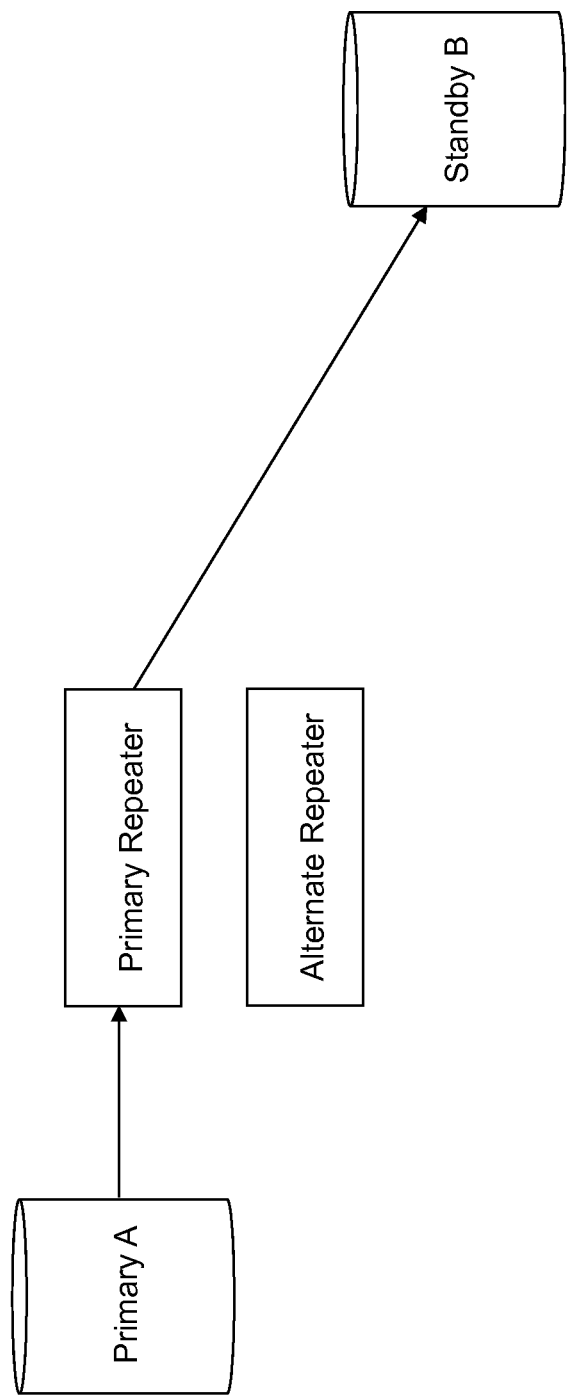
FIGS. 13A-13D provide an illustrative example of alternate Repeaters according to embodiments of the invention.

FIGS. 13A-D provide an illustrative example of how alternate Repeaters can be used in some embodiments of the invention. FIG. 13A illustrates a system having a primary database A and a standby database B. The system also includes a Primary Repeater and an Alternate Repeater.

A transaction that executes on primary database A will need to have its corresponding redo records sent to standby database B. In general, redo records that are generated at primary database A are sent to the Primary Repeater, which then operate to forward the redo records to standby database B. The Alternate Repeater is placed in a standby status if the Primary Repeater is operating correctly. However, if the Primary Repeater fails to operate correctly, then the Alternate Repeater can take over the duties of the Primary Repeater.

Figure 13B:
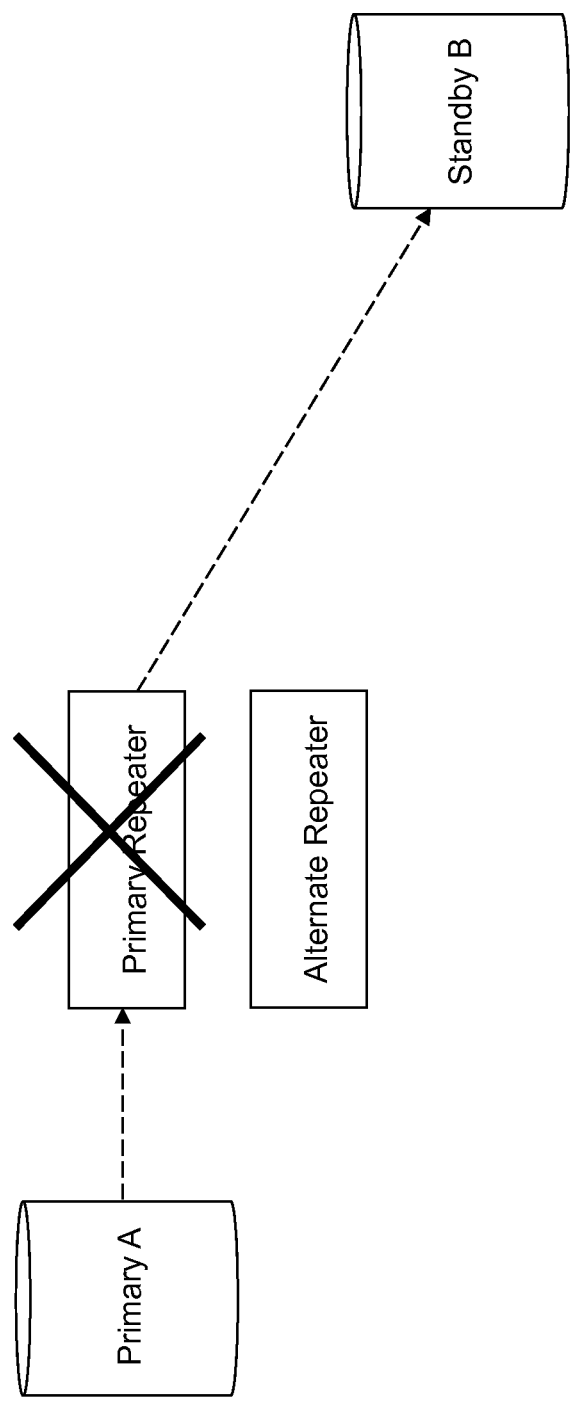

FIG. 13B illustrates the situation when a problem is detected with the operation of the Primary Repeater. For example, there may be some sort of hardware, software, or network problem that prevents the Primary Repeater from adequately performing its duties of receiving the redo records from the primary database A and/or forwarding the redo records to the standby database B.

Figure 13C:
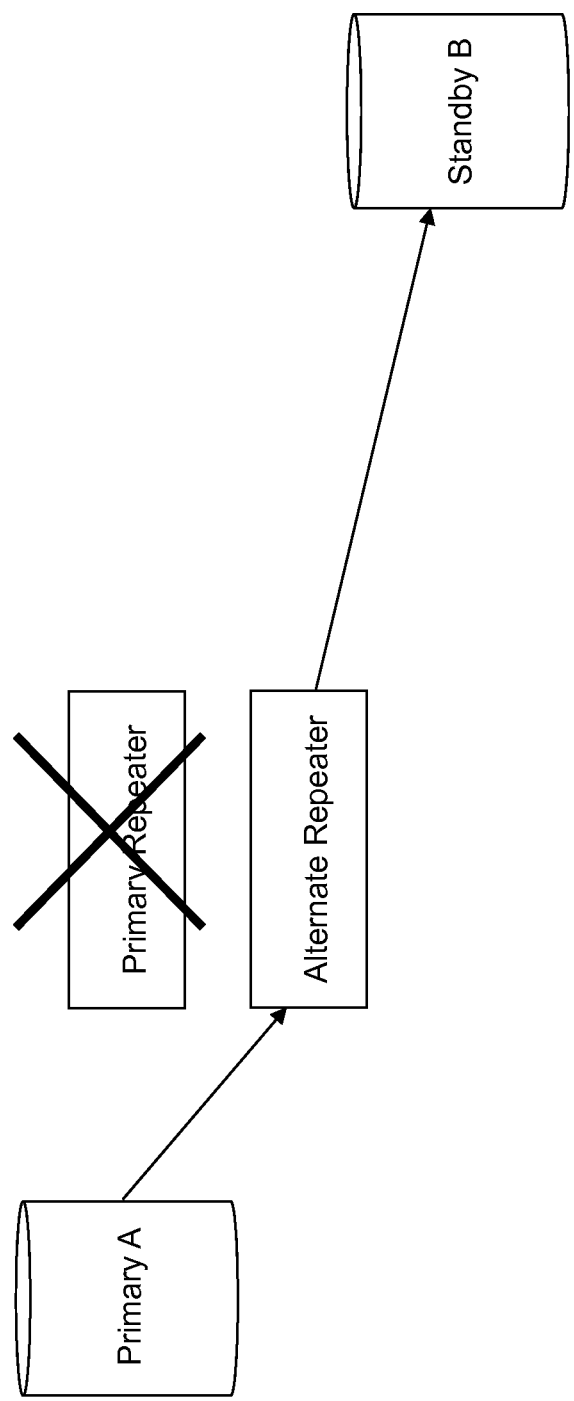

As shown in FIG. 13C, the detection of such problems with the Primary Repeater would cause the Alternate Repeater to be placed into service. The Alternate Repeater would operate the same way as the Primary Repeater, by receiving the redo records from the primary database A and forwarding the redo records to the standby database B.

Figure 13D:
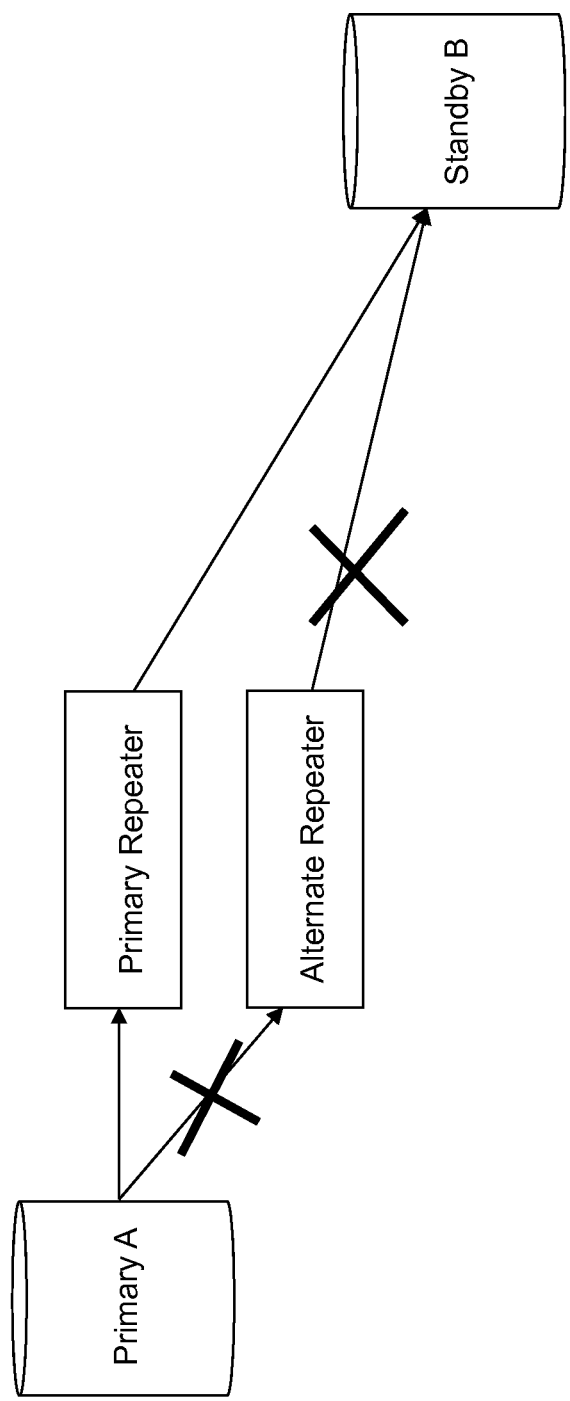

In some embodiments, the system can be configured such that the Alternate Repeater would pass these duties back to the Primary Repeater when it comes back up to an operational status. This situation is illustrated in FIG. 13D, where the Primary Repeater, once it has been restored to a working state, will continue its duties of receiving the redo records from the primary database A and forwarding the redo records to the standby database B. At this point, the Alternate Repeater will stop performing these functions. In an alternate embodiment, the Alternate Repeater will continue its operations even after the original Primary Repeater is restored to operational status, and the original Primary Repeater will operate in standby mode as a backup in case the Alternate Repeater fails.

This document will now explain how a Repeater can determine if it is currently actively participating in the configuration or if it should remain idle. When a Repeater transitions from the idle to active state, it will become the source of live redo for its destinations. As the source of live redo the Repeater will be responsible for servicing live redo as well as resolving archive log gaps.

In some embodiments, when a Repeater instance is mounted, it performs a step of discovering whether it should participate as an active Repeater in a configuration or if it should remain an idle Repeater. An idle Repeater will become an active participant when the primary database establishes connectivity to it. An active Repeater will stop servicing a destination if the Repeater has lost connectivity with the primary and the destination reports back to it that it has another source of live redo. The Repeater will transition to the idle state if all of its destinations have reported that they have another source of live redo.

Consider a first example scenario involving a live redo source and a conditional Repeater. A primary database DB1 services Repeater R1 which services terminal standby database DB2. Neither DB1 nor DB2 service any remote destinations when they are in the standby role. DB2 will service Repeater R2 if it transitions to the primary role. Repeater R2 will service DB1 when it becomes active.

In this initial configuration state, when DB2 is mounted, it will not attempt to communicate with R2 since it is in the standby role. When R1 is mounted, it will attempt to communicate with DB2 and, since DB2 does not have another source of live redo, DB2 will accept the communication with R1. When DB1 is started, it will begin to service R1 which transitions R1 to the active state causing R1 to forward all redo received from DB1 along to DB2. When R2 is mounted, it will attempt to communicate with DB1. However, since DB1 is currently the primary, DB1 will reject the communication and R2 will transition to the idle state. This remains the steady state configuration until a role transition.

Now assume that a switchover is performed and DB2 becomes the primary and DB1 becomes a standby. At this point, DB2 will begin servicing R2. This will transition R2 out of the idle state which prompts it to begin servicing DB1. Since DB1 is now a standby, it accepts the communication. Any attempt of R1 to communicate with DB2 at this time will be rejected and so R1 will transition to the idle state. This remains the new steady state configuration until another role transition.

Consider a second example scenario involving a live redo source and an alternate Repeater. A primary database DB1 is configured to service preferred Repeater R1 and an alternate Repeater R2. Both R1 and R2 are configured to service terminal standby DB2. DB2 does not service any remote destinations when it is mounted.

When R1 and R2 are mounted, they will both establish connectivity with DB2. Since neither Repeater has connectivity with the primary yet, DB2 sees both Repeaters as equal so neither communication is rejected at this time. When DB1 is started, it will establish connectivity with R1, and R1 will forward the redo it receives to DB2. Since R1 now has connectivity with the primary, DB2 firmly establishes R1 as its source of live redo. After this point, if R2 attempts to communicate with DB2, the communication will be rejected and R2 will transition to the idle state.

If DB1 loses connectivity with R1, it will place R1 in a failed state and it will begin to actively service R2. This will transition R2 out of the idle state and into the active state, causing R2 to forward redos to DB2. Since R2 now has connectivity with the primary, DB2 will accept communications with R2 and R2 will become the source of live redo for DB2. If R1 attempts to communicate with DB2 at this time, the communication will be rejected and R1 will transition into the idle state.

If the failure between DB1 and R1 is resolved at some point, DB1 will re-activate R1 and begin servicing it. However, if the configuration is currently in a no data loss state through R2, DB1 cannot simply stop servicing R2 since that would cause a disruption in the no data loss state. Therefore, DB1 will temporarily service both R1 and R2 until the configuration is verified to be in a no data loss state through R1. During this period of dual service, R1 will be instructed not to forward the redo it receives to its terminal destinations so that both Repeaters do not attempt to ship redo to the same destination. Once the configuration is verified to be in a no data loss state through R1, DB1 will drop its connection to R2. Since R2 no longer has connectivity with the primary, the next time it attempts to communicate with DB2, the communication will be rejected and R2 will go idle and R1 will again be flagged as the source of live redo for DB2.

Consider a third example scenario involving bootstrapping gap analysis involving Repeaters. In order for a Repeater to perform gap analysis, it should know the recovery point of each of its destinations and the current log sequence number at the primary. The Repeater obtains the recovery point when it performs gap analysis with its destinations and obtains the current sequence number when the primary performs gap analysis with it. If the primary performs gap analysis with the Repeater before the Repeater has had a chance to acquire the recovery point from its destinations, the Repeater will return an "unknown" gap state. When the primary encounters an unknown gap state, it neither sets nor clears the gap state of the Repeater, but since the initial gap state is always set until proven otherwise, this means the gap state will remain set.

When a Repeater performs gap analysis with its destination, the destination returns its recovery point along with its gap state. The Repeater persists the recovery point of each of its destinations in the control file. When the primary subsequently performs gap analysis with the Repeater, the Repeater verifies that it has all logs between the recovery point and the current sequence at the primary. Any missing logs between those two points are reported as archive log gaps.

When a Repeater transitions from the active state to the idle state, the recovery point is cleared. Therefore, when the Repeater transitions from the idle state back to the active state, it will re-establish the recovery point. Clearing the recovery point is performed so that a stale recovery point, which could conceivably be very old if the Repeater is idle for a long period of time, is not used when the primary re-establishes connectivity.

Therefore, what has been described is an advantageous approach to implement Repeaters, and systems using such Repeaters, to provide no data loss protection without significant performance impacts to the primary database even when a significant geographical distance separates the primary and standby databases.

System Architecture Overview

Figure 14:
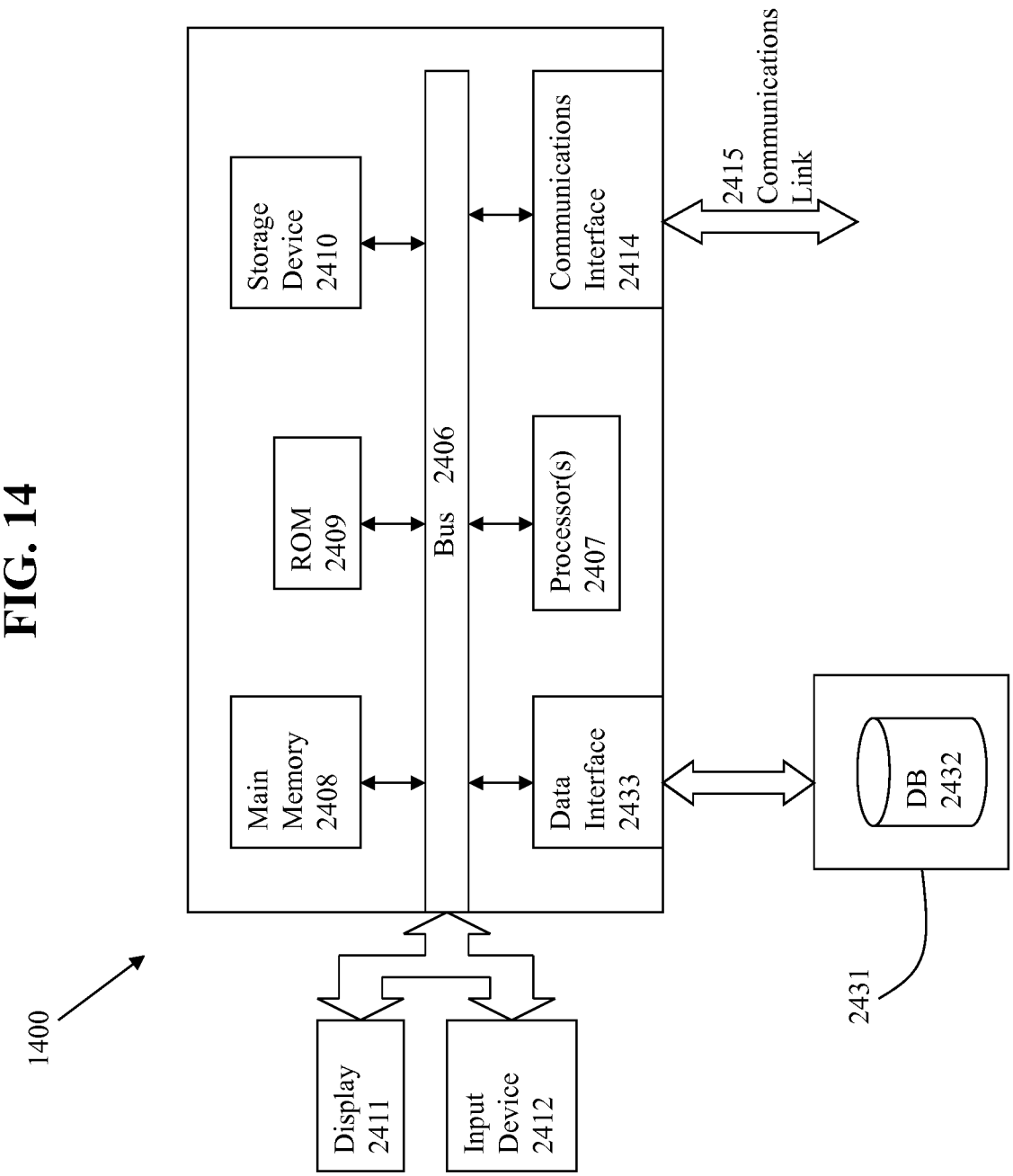
FIG. 14 depicts a computerized system on which an embodiment of the invention can be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
    maintaining a plurality of database systems and a first repeater separate from the plurality of database systems, wherein a first database system of the plurality of database systems is designated as a primary database, the first database system comprising a first set of one or more processors and one or more storage devices and having a primary database and a primary redo log, the primary database having one or more database tables;
    transmitting a first redo log record from the primary redo log of the first database system to the first repeater, the first repeater comprising a processor and a repeater redo log in a memory or storage device but not including the one or more database tables of the primary database, wherein the first repeater stores the first redo log record received from the first database system in the repeater redo log, and wherein the first repeater forwards the first redo log record received from the first database system to one or more standby database systems of the plurality of database systems;
    committing, at the first database system, a transaction corresponding to the first redo log record in response to receiving an acknowledgement from the first repeater, the acknowledgement indicating that the first redo log record was stored at the first repeater, wherein redo log records corresponding to changes to database data on the primary database are to be replicated at the one or more standby database systems, and the acknowledgement for the first redo log record from the first repeater is transmitted before forwarding the first redo log record to the standby database system;
    identifying a change in status of the first database system such that the first database system is no longer designated as the primary database; and
    designating a second database system of the plurality of database systems as the primary database, wherein the second database system is selected from the one or more standby database systems, and the first repeater or a second repeater is selected based at least in part upon a first network latency between the second database system and the first repeater and a second network latency between the second database system and the second repeater which is different from the first repeater.

2. The method of claim 1, wherein the first repeater or the second repeater is selected in response to designating the second database system as the primary database, the second database system and the second repeater not sharing a common point of failure, and the second repeater forwards redo log records from the second database system to the at least one of the one or more standby database systems.

3. The method of claim 2, wherein the first database system, the second database system, the first repeater, and the second repeater correspond to different computing systems, the first database system, the second database system, the first repeater, and the second repeater being electrically connected over portions of a network and located at different geographic locations having different distances from at least two of the first database system, the second database system, the first repeater, and the second repeater, the different distances corresponding to different latencies, at least three of the first repeater, the second repeater, and the standby database systems, not relying on any power sources shared with the primary database and not sharing a common point of failure.

4. The method of claim 1, wherein the first and second repeaters comprise a plurality of relay devices that are not standby database systems that store duplicate copies of the database data, the first and second repeaters being dedicated to redistributing redo log records from the primary database to the one or more standby database systems and do not commit redo log records.

5. The method of claim 1, the status of the first database system is changed due to a failover or a switchover.

6. The method of claim 1, in which a redo source identification is used to configure the first repeater, wherein the redo source identification identifies a source of the redo log records for an entity.

7. The method of claim 6, in which the first repeater includes a specific identification of a redo source and a non-conditional repeater does not include a specific identification of a redo source.

8. A computer program product embodied on a non-transitory computer usable medium having stored thereon a sequence of instructions which, when executed by a processor causes the processor to execute a set of act, the set of acts comprising:
maintaining a plurality of database systems and a first repeater separate from the plurality of database systems, wherein a first database system of the plurality of database systems is designated as a primary database, the first database system comprising a first set of one or more processors and one or more storage devices and having a primary database and a primary redo log, the primary database having one or more database tables;
transmitting a first redo log record from the primary redo log of the first database system to the first repeater, the first repeater comprising a processor and a repeater redo log in a memory or storage device but not including the one or more database tables of the primary database, wherein the first repeater stores the first redo log record received from the first database system in the repeater redo log, and wherein the first repeater forwards the first redo log record received from the first database system to one or more standby database systems of the plurality of database systems;
committing, at the first database system, a transaction corresponding to the first redo log record in response to receiving an acknowledgement from the first repeater, the acknowledgement indicating that the first redo log record was stored at the first repeater, wherein redo log records corresponding to changes to database data on the primary database are to be replicated at the one or more standby database systems, and the acknowledgement for the first redo log record from the first repeater is transmitted before forwarding the first redo log record to the standby database system;
identifying a change in status of the first database system such that the first database system is no longer designated as the primary database; and
designating a second database system of the plurality of database systems as the primary database, wherein the second database system is selected from the one or more standby database systems, and the first repeater or a second repeater is selected based at least in part upon a first network latency between the second database system and the first repeater and a second network latency between the second database system and the second repeater which is different from the first repeater.

9. The computer program product of claim 8, wherein the first repeater or the second repeater is selected in response to designating the second database system as the primary database, the second database system and the second repeater not sharing a common point of failure, and the second repeater forwards redo log records from the second database system to the at least one of the one or more standby database systems.

10. The computer program product of claim 9, wherein the first database system, the second database system, the first repeater, and the second repeater correspond to different computing systems, the first database system, the second database system, the first repeater, and the second repeater being electrically connected over portions of a network and located at different geographic locations having different distances from at least two of the first database system, the second database system, the first repeater, and the second repeater, the different distances corresponding to different latencies, at least three of the first repeater, the second repeater, and the standby database systems, not relying on any power sources shared with the primary database and not sharing a common point of failure.

11. The computer program product of claim 8, wherein the first and second repeaters comprise a plurality of relay devices that are not standby database systems that store duplicate copies of the database data, the first and second repeaters being dedicated to redistributing redo log records from the primary database to the one or more standby database system and do not commit redo log records.

12. The computer program product of claim 8, the status of the first database system is changed due to a failover or a switchover.

13. The computer program product of claim 8, in which a redo source identification is used to configure the first repeater, wherein the redo source identification identifies a source of the redo log records for an entity.

14. The computer program product of claim 13, in which the first repeater includes a specific identification of a redo source and a non-conditional repeater does not include a specific identification of a redo source.

15. An apparatus, comprising:
a plurality of database systems and a first repeater separate from the plurality of database systems, wherein a first database system of the plurality of database systems is designated as a primary database, the first database system comprising a first set of one or more processors and one or more storage devices and having a primary database and a primary redo log, the primary database having one or more database tables;

the first database system implementing:

transmitting a first redo log record from the primary redo log of the first database system to the first repeater, the first repeater comprising a processor and a repeater redo log in a memory or storage device but not including the one or more database tables of the primary database, wherein the first repeater stores the first redo log record received from the first database system in the repeater redo log, and wherein the first repeater forwards the first redo log record received from the first database system to one or more standby database systems of the plurality of database systems;

committing, at the first database system, a transaction corresponding to the first redo log record in response to receiving an acknowledgement from the first repeater, the acknowledgement indicating that the first redo log record was stored at the first repeater, wherein redo log records corresponding to changes to database data on the primary database are to be replicated at the one or more standby database systems, and the acknowledgement for the first redo log record from the first repeater is transmitted before forwarding the first redo log record to the standby database system;

identifying a change in status of the first database system such that the first database system is no longer designated as the primary database; and designating a second database system of the plurality of database systems as the primary database, wherein the second database system is selected from the one or more standby database systems, and the first repeater or the second repeater is selected based at least in part upon a first network latency between the second database system and the first repeater and a second network latency between the second database system and the second repeater which is different from the first repeater.

16. The apparatus of claim 15, wherein the first and second repeaters comprise a plurality of relay devices that are not standby database systems that store duplicate copies of the database data, the first and second repeaters being dedicated to redistributing redo log records from the primary database to the one or more standby database systems and do not commit redo log records.

17. The apparatus of claim 15, the status of the first database system is changed due to a failover or a switchover.

18. The apparatus of claim 15, in which a redo source identification is used to configure the first repeater, wherein the redo source identification identifies a source of the redo log records for an entity.

19. The apparatus of claim 15, wherein the first repeater or the second repeater is selected in response to designating the second database system as the primary database, the second database system and the second repeater not sharing a common point of failure, and the second repeater forwards redo log records from the second database system to the at least one of the one or more standby database systems.

20. The apparatus of claim 19, wherein the first database system, the second database system, the first repeater, the second repeater correspond to different computing systems, the first database system, the second database system, the first repeater, and the second repeater being electrically connected over portions of a network and located at different geographic locations having different distances from at least two of the first database system, the second database system, the first repeater, and the second repeater, the different distances corresponding to different latencies, at least three of the first repeater, the second repeater, and the standby database systems, not relying on any power sources shared with the primary database and not sharing a common point of failure.

\* \* \* \* \*

UNITED STATES PATENT AND TRADEMARK OFFICE
CERTIFICATE OF CORRECTION

PATENT NO. : 11,086,902 B2  
APPLICATION NO. : 16/144126  
DATED : August 10, 2021  
INVENTOR(S) : McGee et al.

Page 1 of 1

It is certified that error appears in the above-identified patent and that said Letters Patent is hereby corrected as shown below:

In the Specification

In Column 12, Line 21, delete "FIGS." and insert -- FIG. --, therefor.

In Column 15, Line 67, delete "PTSN," and insert -- PSTN, --, therefor.

In the Claims

In Column 19, Line 33, in Claim 15, delete "or the" and insert -- or --, therefor.

In Column 20, Line 24, in Claim 20, delete "repeater," and insert -- repeater, and --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*